US011119745B2

(12) United States Patent
Troutman et al.

(10) Patent No.: US 11,119,745 B2
(45) Date of Patent: Sep. 14, 2021

(54) AUTOMATED DEPLOYMENT OF APPLICATIONS

(71) Applicant: Amazon Technologies, Inc., Seattle, WA (US)

(72) Inventors: Andrew Thomas Troutman, Seattle, WA (US); Suryanarayanan Balasubramanian, Bellevue, WA (US); Joshua William McFarlane, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/171,244

(22) Filed: Oct. 25, 2018

(65) Prior Publication Data

US 2019/0065165 A1    Feb. 28, 2019

Related U.S. Application Data

(63) Continuation of application No. 14/537,699, filed on Nov. 10, 2014.

(51) Int. Cl.
*G06F 15/16* (2006.01)
*G06F 9/54* (2006.01)
(Continued)

(52) U.S. Cl.
CPC .................. *G06F 8/60* (2013.01); *G06F 8/65* (2013.01); *G06F 9/45558* (2013.01);
(Continued)

(58) Field of Classification Search
CPC ........................................................ G06F 8/60
See application file for complete search history.

(56) References Cited

U.S. PATENT DOCUMENTS 5,170,464 A * 12/1992 Hayes ................ G06F 11/1438
706/60
6,453,468 B1 9/2002 D'Souza
(Continued)

OTHER PUBLICATIONS

Office action for U.S. Appl. No. 14/537,659, dated Feb. 26, 2016, Troutman et al., "Automated Deployment of Applications", 34 pages.
(Continued)

*Primary Examiner* — Hamza N Algibhah
(74) *Attorney, Agent, or Firm* — Davis Wright Tremaine LLP

(57) ABSTRACT

Functionality is disclosed for automated deployment of applications. A network-based deployment service provides functionality for deploying software components to physical or virtual hosts in a service provider network and/or to hosts in other types of networks external to the service provider network. A user of the deployment service creates an application revision that includes deployable content and an application specification defining how the application is to be deployed and one or more lifecycle events. The application revision is then uploaded to a storage service, source code repository, or other location. A deployment configuration is also created that defines the location of the application revision, a deployment group, and a schedule for the deployment. A deployment agent executing on hosts in the deployment group obtains the application revision from the specified location, deploys the deployable content according to the schedule, and performs the lifecycle events.

20 Claims, 14 Drawing Sheets

(51) Int. Cl.
  *H04L 29/06* (2006.01)
  *G06F 8/60* (2018.01)
  *H04L 29/08* (2006.01)
  *G06F 9/455* (2018.01)
  *G06F 8/65* (2018.01)
  *G06F 9/445* (2018.01)

(52) U.S. Cl.
  CPC .............. *H04L 67/10* (2013.01); *H04L 67/32* (2013.01); *H04L 67/34* (2013.01); *G06F 9/44505* (2013.01); *G06F 2009/4557* (2013.01)

(56) References Cited

U.S. PATENT DOCUMENTS

| | | | |
|---|---|---|---|
| 7,080,279 | B2 | 7/2006 | Asare et al. |
| 7,181,512 | B1 | 2/2007 | Lesher et al. |
| 7,519,964 | B1 | 4/2009 | Islam et al. |
| 7,555,551 | B1 | 6/2009 | McCorkendale et al. |
| 7,865,889 | B1 | 1/2011 | Bird et al. |
| 8,135,775 | B1 | 3/2012 | Anderson et al. |
| 8,224,931 | B1 | 7/2012 | Brandwine et al. |
| 8,359,594 | B1* | 1/2013 | Davidson .............. G06F 9/5077 709/218 |
| 8,407,689 | B2* | 3/2013 | Dournov ............. G06F 9/45533 717/172 |
| 8,589,916 | B2 | 11/2013 | Gao et al. |
| 8,869,135 | B1* | 10/2014 | Fitzgerald ................. G06F 8/65 717/173 |
| 9,092,376 | B1* | 7/2015 | Chelur .................. G06F 16/128 |
| 9,112,891 | B2 | 8/2015 | Pathak |
| 9,135,283 | B2 | 9/2015 | Sivasubramanian et al. |
| 9,158,527 | B2 | 10/2015 | Son |
| 9,229,902 | B1 | 1/2016 | Leis et al. |
| 9,471,358 | B2 | 10/2016 | Goel et al. |
| 9,513,895 | B2 | 12/2016 | Inamdar |
| 9,547,564 | B1 | 1/2017 | Troutman et al. |
| 9,641,406 | B1* | 5/2017 | Allen ....................... G06F 8/65 |
| 2005/0138468 | A1 | 6/2005 | Asare et al. |
| 2006/0092861 | A1* | 5/2006 | Corday .............. H04L 41/0246 370/256 |
| 2006/0190581 | A1 | 8/2006 | Hagale et al. |
| 2006/0245354 | A1* | 11/2006 | Gao .................... H04L 41/5096 370/230 |
| 2007/0043831 | A1 | 2/2007 | Kessler et al. |
| 2007/0226679 | A1 | 9/2007 | Jayamohan et al. |
| 2007/0250575 | A1 | 10/2007 | Tseitlin et al. |
| 2008/0091466 | A1* | 4/2008 | Butler .................... G16H 40/67 705/2 |
| 2008/0189693 | A1 | 8/2008 | Pathak |
| 2009/0013321 | A1* | 1/2009 | Mattiocco ............... G06F 9/455 718/1 |
| 2010/0058318 | A1 | 3/2010 | Bernabeu-Auban et al. |
| 2010/0131084 | A1 | 5/2010 | Van Camp |
| 2011/0083138 | A1 | 4/2011 | Sivasubramanian et al. |
| 2011/0209140 | A1 | 8/2011 | Scheldel et al. |
| 2011/0231280 | A1* | 9/2011 | Farah .................... G06Q 30/04 705/26.8 |
| 2011/0265076 | A1* | 10/2011 | Thorat ...................... G06F 8/65 717/172 |
| 2011/0265077 | A1 | 10/2011 | Collison et al. |
| 2012/0054736 | A1* | 3/2012 | Arcese ...................... G06F 8/65 717/172 |
| 2012/0101998 | A1* | 4/2012 | Cahill ................. G06F 16/2329 707/654 |
| 2012/0102494 | A1* | 4/2012 | Cahill .................... G06F 9/5072 718/102 |
| 2012/0210312 | A1 | 8/2012 | Ma et al. |
| 2013/0007733 | A1* | 1/2013 | Fries .................... G06F 9/45558 718/1 |
| 2013/0067448 | A1 | 3/2013 | Sannidhanam et al. |
| 2013/0086231 | A1 | 4/2013 | Son |
| 2013/0132553 | A1 | 5/2013 | Stratton et al. |
| 2013/0151835 | A1 | 6/2013 | Fontignie et al. |
| 2013/0263120 | A1* | 10/2013 | Patil .................... G06F 9/45558 718/1 |
| 2013/0297964 | A1 | 11/2013 | Hegdal et al. |
| 2014/0013315 | A1 | 1/2014 | Genevski et al. |
| 2014/0123125 | A1 | 5/2014 | Inamdar |
| 2014/0189677 | A1 | 7/2014 | Curzi et al. |
| 2014/0195663 | A1 | 7/2014 | Hirschenberger et al. |
| 2014/0201564 | A1* | 7/2014 | Jagtiani ................. G06F 11/203 714/4.11 |
| 2014/0237090 | A1 | 8/2014 | Lassen et al. |
| 2014/0282472 | A1* | 9/2014 | Vinograd ................... G06F 8/65 717/170 |
| 2014/0379901 | A1* | 12/2014 | Tseitlin ............... H04L 41/5096 709/224 |
| 2015/0089493 | A1* | 3/2015 | Goel .................... G06F 11/1484 718/1 |
| 2015/0134719 | A1 | 5/2015 | Pena-Scheker |
| 2015/0227355 | A1 | 8/2015 | Tripoli et al. |
| 2015/0324215 | A1 | 11/2015 | Borthakur |
| 2015/0347119 | A1 | 12/2015 | Wang et al. |
| 2015/0358198 | A1 | 12/2015 | Mahajan et al. |
| 2015/0378702 | A1 | 12/2015 | Govindaraju et al. |
| 2015/0378765 | A1 | 12/2015 | Singh et al. |
| 2016/0036667 | A1* | 2/2016 | Kripalani .................. G06F 8/61 709/224 |
| 2016/0077855 | A1* | 3/2016 | Zu ....................... G06F 9/45533 718/1 |
| 2016/0099883 | A1 | 4/2016 | Voit et al. |
| 2016/0188877 | A1* | 6/2016 | Simha ................... G06F 21/552 726/22 |
| 2017/0034834 | A1 | 2/2017 | Folke et al. |
| 2019/0065165 | A1 | 2/2019 | Troutman et al. |

OTHER PUBLICATIONS

Office action for U.S. Appl. No. 14/537,659, dated Jun. 24, 2016, Troutman et al., "Automated Deployment of Applications", 33 pages.

Office action for U.S. Appl. No. 14/537,659, dated Sep. 28, 2015, Troutman et al., "Automated Deployment of Applications", 27 pages.

Office action for U.S. Appl. No. 14/537,699, dated Nov. 17, 2016, Troutman et al., "Automated Deployment of Applications," 10 pages.

Office action for U.S. Appl. No. 14/537,738, dated Apr. 7, 2016, Troutman et al., "Automated Deployment of Applications", 9 pages.

Stockton, "Blue Green deployment," Cake Solutions, May 27, 2014, retrieved Jul. 13, 2018, from https://www.cakesolutions.net/teamblogs/blue-green-deployment, 4 pages.

* cited by examiner

AUTOMATED DEPLOYMENT OF APPLICATIONS

CROSS REFERENCE TO RELATED APPLICATION

This application is a continuation of U.S. patent application Ser. No. 14/537,699, filed Nov. 10, 2014, the disclosure of which is incorporated herein by reference in its entirety.

BACKGROUND

Deployment of software to a large number of network hosts ("hosts") in a fleet can be a complex and time consuming process. For example, a fleet containing a large number of physical or virtual machine hosts might be utilized to provide a network-accessible service or application, such as a Web site. In order to deploy the software for providing the service or application to the hosts in the fleet, or an update to the software, it may be necessary for a system administrator to perform many complex manual tasks and/or to utilize many different types of software components. In addition, it might be difficult for a system administrator to coordinate the deployment of the software to the hosts in a fleet in a way that does not negatively impact the performance of the service or application provided by the hosts. Deployment of software to hosts in a fleet efficiently, and in a way that does not negatively impact application performance, can be complicated and time consuming, even for skilled system administrators.

The disclosure made herein is presented with respect to these and other considerations.

DETAILED DESCRIPTION

Figure 1A:
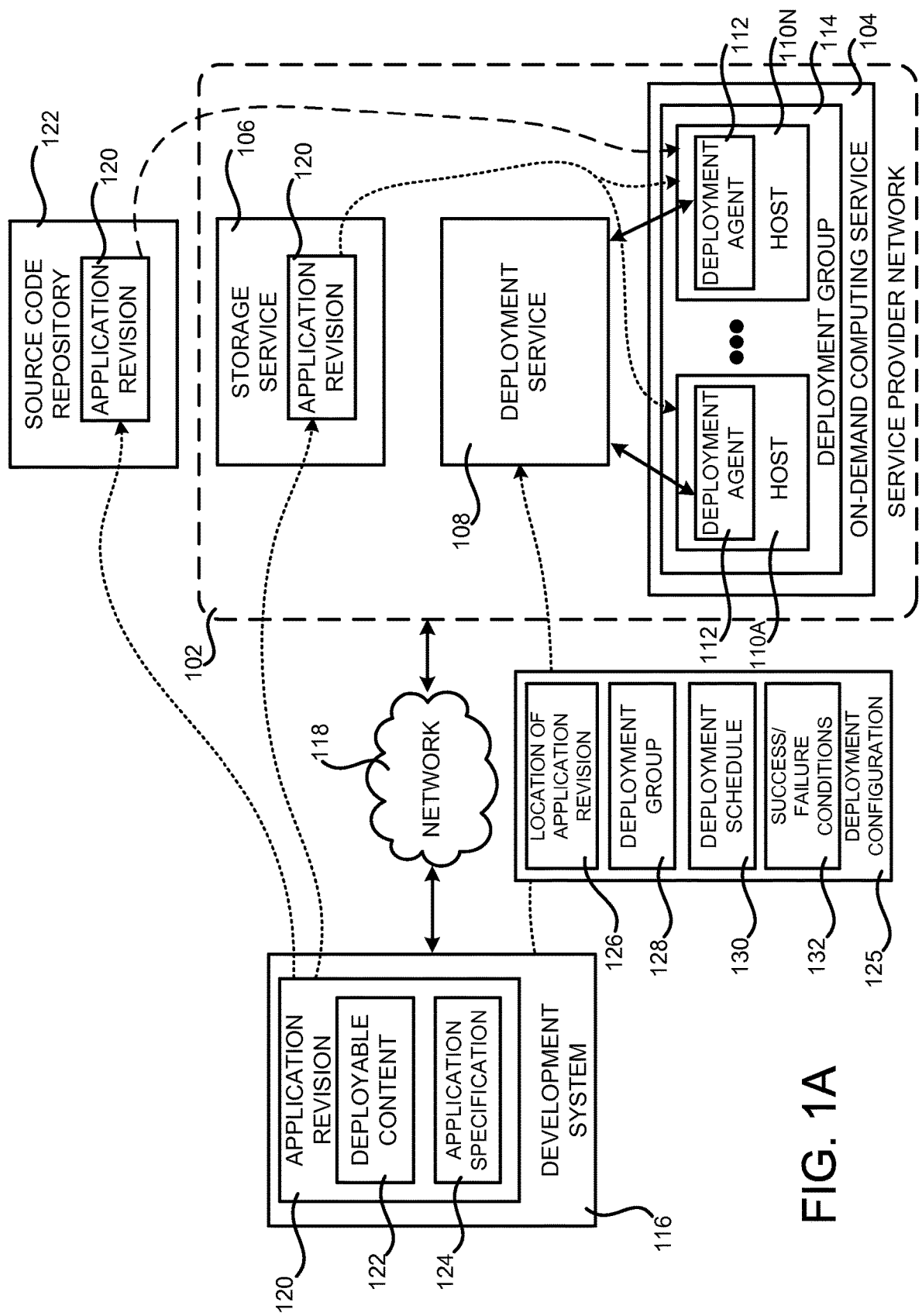
FIG. 1A is a system architecture diagram showing aspects of the configuration and operation of a deployment service for deploying applications to hosts in a service provider network.

The following detailed description is directed to technologies for automated deployment of software to one or more hosts, such as the hosts in a fleet of hosts provided by a service provider network or an on-premises network. Utilizing an implementation of the technologies described herein, a system administrator can reliably and rapidly deploy software to hosts in a fleet of hosts. Additionally, the software can be deployed in a way that minimizes any negative effects on application performance. Deployments can also be stopped and rolled back in the event of errors. A system administrator can also initiate and track the status of deployments through a centralized deployment service.

According to one configuration presented herein, a deployment service is provided that operates within or in conjunction with a service provider network. The deployment service is a network service that provides functionality for coordinating the deployment of software to one or more hosts in a fleet of hosts. The hosts may be physical hosts such as server computers, or virtual hosts such as virtual machine instances. The hosts might also be provided by the service provider network or located in a network external to the service provider network, such as hosts in a network owned or operated by a customer or other user of the deployment service.

As will be described in greater detail below, the deployment service provides functionality for allowing a user (who also might be referred to as a "customer") of the deployment service to supply a deployment configuration that defines aspects of a software deployment to be performed by the deployment service. For example, the deployment configuration might specify the location of an application revision that contains deployable content (which might be referred to herein as an "application") that is to be deployed to one or more physical or virtual hosts in a deployment group. A deployment group is a group of hosts to which a deployment is to be made. The deployment service might also provide functionality for allowing a user to define the hosts that are in a deployment group. The deployment configuration might also specify a schedule (which might also be referred to herein as a "strategy" or a "deployment strategy") for deploying the application. In some configurations, the deployment configuration might also define one or more success or failure conditions for the deployment.

In some configurations, the deployment service is implemented in a service provider network. Additionally, in some configurations a user of the deployment service might store the application revision containing the application to be deployed in a storage service that is also provided by the service provider network. In another configuration, the application is stored in a source code repository or revision control system that is external to the service provider network. For instance, in one specific configuration the application revision is stored in the GITHUB revision control system. Other source code repositories and/or revision control systems within or external to the service provider network might also be utilized to store the application revision for deployment.

The application revision defined by the user of the deployment system includes deployable content (i.e. the executable and/or non-executable files making up all or a portion of the application to be deployed). The application revision may further include an application specification that defines how the hosts are to deploy the application. For example, and without limitation, the application specification might provide a mapping between files in the application revision and locations on a host.

The application specification might also define one or more lifecycle events to be performed by the hosts to which the application is deployed. For example, and without limitation, the application specification might define scripts that are to be performed prior to deploying the application on a host, following deployment of an application on a host, prior to executing the application on a host, and/or following the termination of the application on a host. Other types of lifecycle events might also be defined for execution at different times during the deployment and/or execution lifecycle of an application.

As mentioned briefly above, the deployment configuration might specify a schedule for deployment of an application. The deployment service utilizes the specified schedule to determine whether the application is to be deployed to the hosts in a deployment group. Various types of schedules might be defined by a user of the deployment service in various configurations. For example, rather than deploying an application to all of the hosts in a deployment group concurrently, the schedule might specify a schedule for a "rolling" deployment in which an application is deployed to a subset of the hosts in a deployment group at a time. Deploying an application using a well-defined rolling deployment can ensure that the deployment of the application to the hosts results in minimal loss of processing capacity.

In one configuration, the schedule specifies a percentage-based deployment wherein a rolling deployment of the application is performed to a percentage of the hosts in a deployment group at a time (e.g. 10%). When the application has been successfully deployed to the specified percentage of hosts, the application will then be deployed to the next percentage of hosts (i.e. the next 10% of the hosts) until the application has been deployed to all of the hosts in the deployment group.

An exponential deployment schedule might also be defined in some configurations. An exponential deployment schedule allows the number of hosts to which an application is deployed at a time to increase exponentially. For instance, and without limitation, an application might first be deployed to two hosts in a fleet. If the deployment completes successfully, it might then be made to four hosts. Deployment might then continue to an exponential number of hosts at a time until the application has been deployed to all of the hosts in the fleet.

A function-based deployment schedule might also be defined in some configurations. Using this mechanism, a user of the deployment service defines an arbitrary mathematical function that defines the rate at which an application is to be deployed to subsets of hosts in a deployment group. The deployment service utilizes the specified function to perform the deployment. It should be appreciated that the deployment schedules mentioned above are merely illustrative and that other deployment schedules might be utilized in other configurations.

In some configurations, an application is deployed to the hosts in a deployment group using an "in-place" deployment. In an in-place deployment, a host might be taken out of service (e.g. removed from a load balancer or other networking device or service that routes traffic to the host) and the application is then deployed to the host. Once the application has been successfully deployed to the host, the host may be returned to operational status (e.g. added back to the load balancer so that it can once again begin serving network traffic).

In another configuration, an application might be deployed to hosts using a "replacement" deployment (which might also be referred to as a "blue/green" deployment). In a replacement deployment, a new host is instantiated, such as for example using an on-demand computing service provided by a service provider network. The application is then deployed to the new host. Once the application has been deployed to the new host, the new host is added to a deployment group (e.g. by adding the new host to a load balancer or other networking device or service that routes traffic to the deployment group). Another host might then be removed from the deployment group.

In some configurations, the hosts removed from a deployment group during a replacement deployment might be retained for some period of time following the deployment. If one or more user-defined failure conditions occur within a user-specified period following the deployment, the removed hosts can be quickly returned back to the deployment group. In this way, the deployment of an application can be rolled back with little operational impact on the deployment group for a user-defined period following the deployment.

The hosts to which an application is to be deployed may be configured to execute a deployment agent. In one configuration, the deployment agent is configured to periodically poll the deployment service to determine if an application is to be deployed. In other configurations a push mechanism might be utilized by which the deployment service "pushes" notifications to the hosts indicating that an application is to be deployed. Other mechanisms might be utilized in other configurations to inform the deployment agents executing on the hosts that an application is to be deployed.

When a host is selected for deployment, the deployment service may instruct the deployment agent executing on the host to obtain the application revision from the location specified in the deployment configuration and to deploy the application. In turn, the deployment agent obtains the application revision from the specified location (e.g. from a storage service in the service provider network or an external source code repository). The deployment agent then utilizes the application specification in the application revision to deploy the application. The deployment agent may also perform any lifecycle events defined in the application specification.

The hosts might also determine if any of the user-specified failure conditions occurred during the deployment. If no failure conditions occurred (i.e. the application deployment was successful), the deployment service might continue deploying the application to other hosts in the deployment group. If a failure condition or conditions occurred (i.e. the deployment was unsuccessful), the deployment service might roll back the deployment of the application. For example, and as described briefly above, when a replacement deployment is performed, the hosts replaced in the deployment group might quickly be returned to service.

In order to provide the functionality described above, the deployment service or another component might expose various network service application programming interfaces ("APIs") in some configurations. For example, and without limitation, the deployment service might expose APIs for configuring and initiating a deployment of an application in the manner described herein. Other types of APIs for performing other types of functions might also be provided in other configurations.

In some configurations, the application revision is defined such that it contains only files that have changed as compared to a previous version of the application. In this way, only the files that need to be updated on a host are transferred to the storage service or external source code repository and to the hosts for deployment. This configuration can save significant network bandwidth during deployment, especially where a large application is deployed to a large number of geographically disparate hosts. Additional details regarding the various components and processes described briefly above for automated deployment of applications to hosts in a fleet will be presented below with regard to FIGS. 1-11.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1A is a system architecture diagram showing aspects of the configuration and operation of a deployment service 108 for deploying applications to hosts 110, such as those in a service provider network 102. As shown in FIG. 1A and described briefly above, the deployment service 108 might operate within or in conjunction with a service provider network 102, from which customers can purchase and utilize computing resources (which may be referred to herein as "resources"), such as virtual machine instances and/or other types of computing resources, from a service provider on a permanent or as-needed basis.

Each type or configuration of a computing resource may be available from the service provider network 102 in different sizes. For example, a service provider might offer physical hosts, virtual machine instances or other types of data processing resources that are available for purchase and use that have many different configurations of processor capabilities, main memory, disk storage, and operating system. In this regard, it should be appreciated that the term "host" as used herein might also encompass other types of execution environments, such as software containers.

A service provider might also offer other types of resources for purchase and use by customers. For example, a service provider might offer hardware devices, database resources, file or block data storage resources, and/or networking resources, such as load balancing resources, domain name service ("DNS") resources, virtual private cloud ("VPC") resources, virtual local area network ("VLAN") resources, and/or other types of hardware and software computing resources or services on a permanent or as-needed basis.

The service provider operating the service provider network 102 might also charge a fee for operating the resources to a customer that creates and uses the resources. The fee charged for a particular resource might be based upon the type and/or configuration of the resource. For example, in the case of a data processing resource, like a virtual machine instance, the fee for use of the resource might be charged based upon the amount of time the resource is utilized. In the case of a data storage resource, the fee might be computed based upon the amount of data stored and/or the amount of data transferred into or out of the resource. The fees for other types of resources might also be based upon other considerations. A service provider might also utilize various purchasing models to determine the amount to charge a customer for use of resources provided by the service provider network 102.

The resources described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks ("WANs"), such as the Internet. In the environment shown in FIG. 1A, a service provider might operate one or more data centers configured to provide the resources in the service provider network 102 to its customers over a network 118.

The resources described briefly above might also be provisioned and de-provisioned as needed in an automated fashion. For example, the service provider network 102 might be configured to instantiate a new instance of a computing resource, such as a virtual machine instance, in response to an increase in demand for a network service or other condition. Other types of computing resources might also be provisioned and de-provisioned in a similar manner. Services in the service provider network 102 might also provide functionality for automatically scaling and/or de-scaling resources based upon demand for the resources and/or other factors.

A customer or potential customer of the service provider network 102 might utilize an appropriate computing system, such as the development system 116, to communicate with the service provider network 102 over an appropriate data communications network 118. In this way, a customer of the service provider network 102 can configure various aspects of the operation of the computing resources provided by the service provider network 102, or to otherwise control any computing resources being utilized by the customer. For example, and without limitation, a computing system utilized by a customer of the service provider network 102 might be utilized to purchase computing resources in the service provider network 102, to configure aspects of the operation of the computing resources, to deploy applications in the manner described herein, and/or to perform other types of functionality with regard to the operation of the computing resources provided by the service provider network 102.

A customer computing system, such as the development system 116, might be any type of computing device capable of connecting to the service provider network 102 via a suitable data communications network 118 such as, but not limited to, a laptop or desktop computer, a tablet computing device, a server computer, or a mobile telephone. Administrative users employed by the operator of the service provider network 102, such as administrators managing the operation of the service provider network 102, might also connect with and utilize resources provided by the service provider network 102 in a similar fashion.

The service provider network 102 might also be configured to provide various types of network services for use internally and by customer customers. For example, and without limitation, the service provider network 102 may provide an on-demand computing service 104 for providing physical or virtual machine hosts 110 on-demand, a data storage service 106 for storing data, a cryptography service, a notification service, an authentication service, a policy management service, a task service and, potentially, other types of network-accessible services. These and other services may be utilized together to implement various types of network-based applications in the service provider network 102. Additional details regarding one implementation of the service provider network 102 and the various types of network services that might be provided by the service provider network 102 will be provided below with regard to FIGS. 8-10.

As discussed briefly above, the service provider network 102 is also configured with a deployment service 108 in one configuration. The deployment service 108 is a network service that provides functionality for coordinating the deployment of software (which may referred to herein as an "application" or "applications") to one or more hosts 110 in a fleet of hosts. As also mentioned above, the hosts 110 may be physical hosts such as server computers, or virtual hosts such as virtual machine instances provided by the on-demand computing service 104 in one particular configuration. The hosts 110 might also be provided by the on-demand computing service 104 operating in the service provider network 102 as shown in FIG. 1A. Alternately, the hosts 110 might be located in a network external to the service provider network 102, such as hosts 110 in a network owned or operated by a customer or user of the deployment service. Additional details regarding a configuration wherein the hosts 110 are external to the service provider network 102 will be described below with regard to FIG. 1B.

As also shown in FIG. 1A, a customer or other user of the service provider network 102 might utilize a development system 116 to utilize functionality provided by the deployment service 108. In particular, the development system 116 might be utilized to create an application revision 102. The application revision 102 defined by the user of the deployment system includes deployable content 122 (i.e. the executable and/or non-executable files making up all or a portion of the application to be deployed). The application revision 120 may further include an application specification 124 that defines how the hosts 110 are to deploy the application. For example, and without limitation, the application specification 124 might provide a mapping between files in the application revision and locations on the file system of a host 110.

The application specification 124 might also define one or more lifecycle events to be performed by the hosts 110 to which the application is deployed or by other systems and/or services within or external to the service provider network. For example, and without limitation, the application specification 124 might define scripts that are to be performed prior to deploying the application on a host 110 (e.g. stop the execution of the application), following deployment of an application on a host 110 (e.g. start the execution of the application), prior to executing the application on a host 110, and/or following the start of execution (e.g. confirm that the application is executing properly) or termination of the application on a host 110. Other types of lifecycle events might also be defined for execution at different times during the deployment and/or execution lifecycle of an application. A status report might also be provided back to the deployment service 108 or another user-defined location following the completion of the lifecycle events described above. Additional details regarding the performance of one or more customer-specified deployment lifecycle events will be provided below with regard to FIG. 6.

As shown in FIG. 1A, in some configurations a user of the deployment service might utilize the development system 116 to store the application revision 120 containing the application to be deployed in a storage service 106 that is also provided by the service provider network 102. In another configuration, the deployment system 116 might be utilize to store the application revision in a source code repository 122 or revision control system that is external to the service provider network 102. For instance, in one specific configuration the application revision 120 is stored in the GITHUB revision control system. Other source code repositories and/or revision control systems within or external to the service provider network 102 might also be utilized to store the application revision for deployment.

The deployment service 108 also provides functionality for allowing a user to supply a deployment configuration 125 for use with the application revision 120 that defines aspects of a deployment to be performed by the deployment service 108. For example, the deployment configuration 125 might specify the location 126 (e.g. in the storage service 106 or the source code repository 122) of the application revision 120 that contains the deployable content 122 that is to be deployed to one or more physical or virtual hosts 110 in a deployment group 114. In some configurations, the deployment configuration 125 might also define one or more success or failure conditions 132 for the deployment.

The deployment configuration 125 also includes data 128 identifying the deployment group 114 to which the identified application revision 124 is to be deployed. As mentioned briefly above, a deployment group 114 is a group of hosts 110 to which a deployment is to be made. The deployment service 108 might also provide an API or another mechanism for allowing a user to define the hosts 110 that are in a deployment group 114. It should be appreciated that different deployment groups 114 might be created to execute different versions of an application. For example, and without limitation, a deployment group 114 might be created to run a development version of an application, another deployment group 114 might be created to run a test version of an application, and another deployment group 114 might be created to run a production version of an application. The deployment groups 114 might have hosts 110 that are in different geographical locations.

The deployment configuration 125 might also specify a schedule 130 for deploying the application. The deployment service 108 utilizes the specified schedule 130 to determine whether the application is to be deployed to the hosts 110 in the deployment group 114 specified by the data 128 in the deployment configuration 125. As also mentioned above, various types of schedules might be defined by a user of the deployment service 108 in various configurations. For example, rather than deploying an application to all of the hosts 110 in a deployment group 114 concurrently, the schedule 130 might specify a schedule for a "rolling" deployment in which an application is deployed to a subset of the hosts 110 in a deployment group 114 at a time. Deploying an application using a well-defined rolling deployment schedule can ensure that the deployment of the application to the hosts 110 results in minimal loss of processing capacity.

In one configuration, the schedule 130 specifies a percentage-based deployment wherein a rolling deployment of the application is performed to a percentage of the hosts 110 in a deployment group 114 at a time (e.g. 10%). A customer might specify a percentage of hosts to which an application is to be deployed at a time (e.g. 10%) or specify the percentage as a raw number (e.g. deploy to ten of 100 hosts at a time). When the application has been successfully deployed to the specified percentage of hosts 110, the application will then be deployed to the next percentage of hosts 110 (i.e. the next 10% of the hosts) until the application has been deployed to all of the hosts 110 in the deployment group 114.

The schedule 130 might also be an exponential deployment schedule that allows the number of hosts 110 to which an application is deployed at a time to increase exponentially. For instance, and without limitation, an application might first be deployed to two hosts 110 in a deployment group 114. If the deployment completes successfully, it might then be made to four hosts 110. Deployment might then continue to an exponentially increasing number of hosts 110 at a time until the application has been deployed to all of the hosts 110 in the deployment group 114.

A function-based deployment schedule 130 might also be defined in some configurations. Using this mechanism, a user of the deployment service 108 defines an arbitrary mathematical function that defines the rate at which an application is to be deployed to subsets of hosts 110 in a deployment group 114. The deployment service 108 utilizes the specified function to perform the deployment. It should be appreciated that the deployment schedules 130 mentioned above are merely illustrative and that other deployment schedules 130 might be utilized in other configurations. For example, and without limitation, a user might specify a schedule 130 such that an application will be deployed to one host 110 at a time, to all of the hosts 110 in a deployment group 114 at the same time, or in another manner.

A schedule 130 might also be defined that specifies confidence intervals that increase the number of hosts 110 to which the application is deployed based upon the success or failure of the deployment. In this way, deployment might start with a small subset of hosts 110. If the deployment to the small subset is successful, the next subset of hosts 110 to which the application is deployed may then be increased. This process might continue until the deployment has completed to all of the hosts 110 in a deployment group 114. Additional details regarding utilizing the schedules 130 described above to perform a rolling deployment will be provided below with regard to FIG. 4.

In some configurations, an application is deployed to the hosts 110 in a deployment group 114 using an "in-place" deployment. In an in-place deployment, a host 110 might be taken out of service (e.g. removed from a load balancer or other networking device or service that routes traffic to the host 110) and the application is then deployed to the host 110. Once the application has been successfully deployed to the host 110, the host 110 may be returned to operational status (e.g. added back to the load balancer so that it can once again begin serving network traffic). Additional details regarding an in-place deployment will be provided below with regard to FIG. 3A.

In another configuration, an application might be deployed to hosts 110 in a deployment group 114 using a "replacement" deployment (which might also be referred to as a "blue/green" deployment). In a replacement deployment, a new host 110 is instantiated, such as for example using the on-demand computing service 104 provided by the service provider network 102. The application is then deployed to the newly instantiated host 110. Once the application has been deployed to the new host 110, the new host 110 is added to the deployment group 114 (e.g. by adding the new host to a load balancer or other networking device or service that routes traffic to the deployment group 114). Another host 110 might then be removed from the deployment group 114. The deployment configuration 125 or another mechanism might be utilized to specify whether a particular deployment is to be performed as an in-place or a replacement deployment. Additional details regarding a replacement deployment will be provided below with regard to FIG. 3B.

In some configurations, the hosts 110 removed from a deployment group 114 during a replacement deployment might be retained for some period of time following the deployment. If one or more user-defined failure conditions 132 occur within a user-specified period following the deployment, the removed hosts 110 can be quickly returned back to the deployment group 114. In this way, the deployment of an application can be rolled back with little operational impact on the deployment group 114 for a user-defined period following the deployment. Additional details regarding a mechanism for rolling back an replacement deployment will be provided below with regard to FIG. 5A. Additional details regarding a mechanism for rolling back an in-place deployment will be provided below with regard to FIG. 5B.

As shown in FIG. 1A, the hosts 110 to which an application is to be deployed may be configured to execute a deployment agent 112 in one configuration. The deployment agent 112 may be configured to periodically poll the deployment service 108 to determine if an application is to be deployed to the host 110 upon which the deployment agent 112 is executing. In other configurations, a push mechanism might be utilized by which the deployment service 108 "pushes" notifications to the deployment agent 112 indicating that an application is to be deployed to the host 110 upon which the deployment agent 112 is executing. Other mechanisms might be utilized in other configurations to inform the various instances of the deployment agent 112 executing on the hosts 110 that an application is to be deployed thereupon.

When a host 110 is selected for deployment, the deployment service 108 may instruct the deployment agent 112 executing on the host 110 to obtain the application revision 120 from the location 126 specified in the deployment configuration 125 and to deploy the application. In turn, the deployment agent 112 obtains the application revision 120 from the specified location (e.g. from a storage service 106 in the service provider network 102 or an external source code repository 122). The deployment agent 112 then utilizes the application specification 124 in the application revision 120 to deploy the application onto the host 110 upon which it is executing. The deployment agent 112 may also perform any lifecycle events defined in the application specification 124. Additional details regarding the deployment process described above will be provided below with regard to FIG. 2.

The hosts 110 might also determine if any of the user-specified failure conditions 132 occurred during the deployment. If no failure conditions 132 occurred (i.e. the application deployment was successful), the deployment service 108 might continue deploying the application to other hosts 110 in the deployment group 114. If a failure condition 132 or conditions occurred (i.e. the deployment was unsuccessful), the deployment service 108 might roll back the deployment of the application. For example, and as described briefly above, when a replacement deployment is performed, the hosts 110 replaced in the deployment group 114 might quickly be returned to service.

In order to provide the functionality described above, the deployment service 108 or another component might expose various network service APIs and/or command line interfaces ("CLIs") in some configurations. For example, and without limitation, the deployment service 108 might expose APIs or CLIs for defining and/or registering an application with the deployment service 108 and for configuring and initiating a deployment of the application in the manner described herein. APIs might also be provided for submitting the information described above as being contained in the deployment configuration 125. For example, APIs might be provided for submitting the location 126 of the application revision 120, for providing data 128 identifying the deployment group 114 for a deployment, for defining the deployment schedule 130, for defining the success and/or failure conditions 132 and/or for defining other aspects of a deployment. The deployment service 108 might also provide other APIs or CLIs for monitoring the status of an in-progress deployment, obtaining the status of a instances in a deployment, for troubleshooting a deployment, for stopping an in-progress deployment, and/or for rolling back a failed or problematic deployment. Other types of APIs for performing other types of functions might also be provided in other configurations.

In some configurations, the application revision 120 is defined such that it contains only deployable content 122 that has changed as compared to a previous version of the application. In this way, only the files that need to be updated on a host are transferred to the storage service 106 or to the external source code repository 122 and, subsequently, to the hosts 110 for deployment. This configuration can save significant network bandwidth during deployment, especially where a large application is deployed to a large number of geographically disparate hosts 110. Additional details regarding the performance of an incremental file deployment will be provided below with regard to FIG. 7.

Figure 1B:
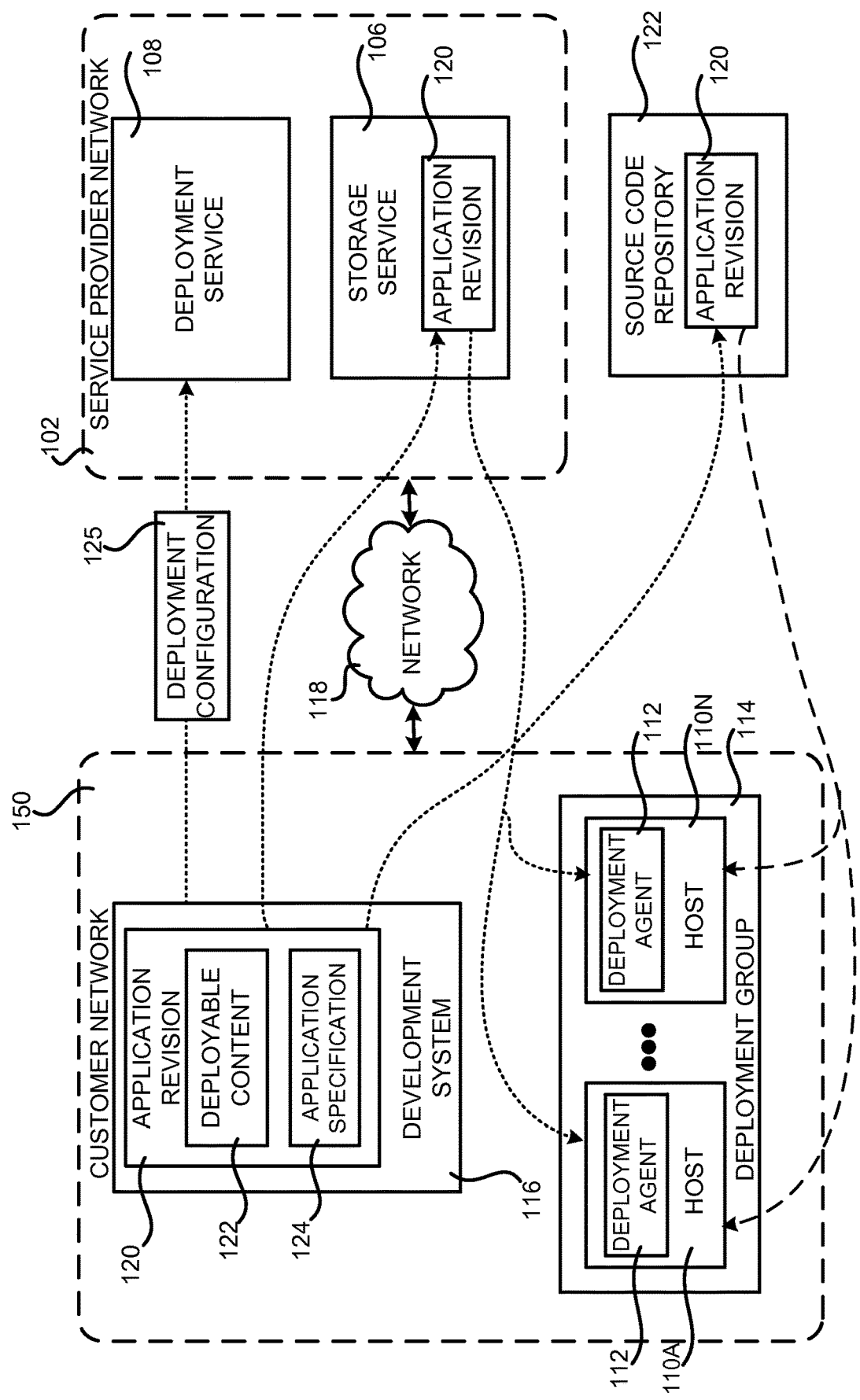
FIG. 1B is a system architecture diagram showing aspects of the configuration and operation of a deployment service for deploying applications to hosts in a customer owned and/or operated network.

FIG. 1B is a system architecture diagram showing aspects of the configuration and operation of the deployment service 108 for deploying applications to hosts 110 that are located external to the service provider network 102, such as in a network 150 owned and/or operated by a customer of the service provider network 102. For example, and as shown in FIG. 1B, a customer of the service provider network 102 and/or the deployment service 108 might operate a development system 116 in their own network 150. As described above, the development system 116 might be utilized to create an application revision 120. The application revision might then be uploaded to a storage service 106 in the service provider network 102. Alternately, the application revision 120 might be provided to a source code repository 122 and/or other type of source control system. The application revision 120 might also be hosted in the network 150 or in another location.

In the configuration shown in FIG. 1B, the physical or virtual machine hosts 110 in the deployment group 114 to which the application is to be deployed are in the network 150 rather than in the service provider network 102. Additionally, the hosts 110 in the network 150 might utilize an authentication mechanism to authenticate with the storage service 106. In other ways, however, the configuration shown in FIG. 1B operates in the same manner as the configuration shown in FIG. 1A and described above. For instance, the deployment service 108 may utilize the deployment configuration 125 and the schedule 130 specified therein to select hosts in the deployment group 114 for deployment of the application. The instances of the deployment agent 112 executing on the hosts 110 in the deployment group 114 receive instructions from the deployment service 108 to obtain the application revision 120 from the storage service 106, the source code repository 122, or other location. The instances of the deployment agent 112 then obtain the application revision 120, perform the deployment including any user-defined lifecycle events, and report the results back to the deployment service 108.

Figure 2:
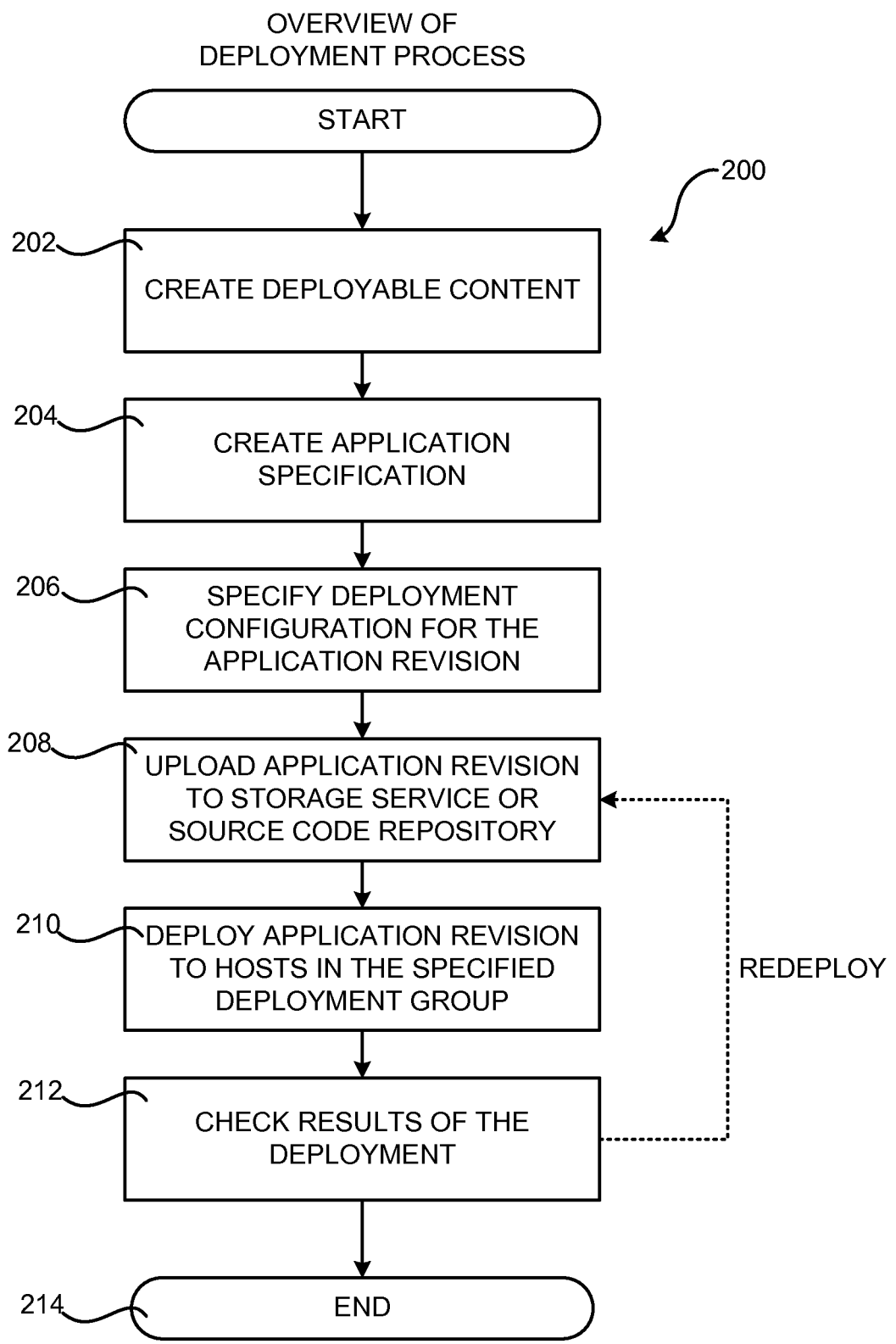
FIG. 2 is a flow diagram illustrating aspects of the overall operation of one mechanism disclosed herein for automated deployment of an application to a fleet of hosts.

FIG. 2 is a flow diagram showing a routine 200 that illustrates aspects of the overall operation of one mechanism disclosed herein for automated deployment of an application to a fleet of hosts 110. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where a user of the storage service 106 creates deployable content 122. For example, and without limitation, a user might utilize software development tools executing on the development system 116 or another system (e.g. a development system within the service provider network 102) to create executable, interpretable and/or other type of program code. The user might create other types of non-executable files, such as graphics, text, configuration files, packages, and/or other content for use by the application. In this regard, it should be appreciated that the term deployable content is meant to encompass any type of file that is used to provide an application on the hosts 110.

Once the deployable content 122 has been created, the routine 200 proceeds to operation 204, where the application specification 124 for the deployable content 122 is created. As discussed above, the application specification 124 includes data that defines how the hosts 110 are to deploy the deployable content 122. For example, and without limitation, the application specification 124 might provide a mapping between the files of the deployable content 122 and file system locations on a host 110. As also discussed above, the application specification 124 for the deployable content 122 might also define one or more lifecycle events to be performed by the hosts 110 in conjunction with the deployment and/or execution of the deployable content 122. For example, and without limitation, the application specification 124 might define scripts that are to be performed prior to deploying the application on a host 110, following deployment of an application on a host 110, prior to executing the application on a host 110, and/or following the termination of the application on a host 110. Other types of lifecycle events might also be defined for execution at different times during the deployment and/or execution lifecycle of an application.

From operation 204, the routine 200 proceeds to operation 206, where the user might specify a deployment configuration 125 for the deployable content (i.e. the application that is to be deployed). As discussed above, the deployment configuration 125 may include a location 126 of the application revision 120 containing the deployable content 122 and the application specification 124. The deployment configuration 125 might also include data 128 defining a deployment group 114 to which the deployable content 122 is to be deployed. The deployment configuration 125 might also define a deployment schedule 130 and the type of deployment to be performed (e.g. an in-place deployment or a replacement deployment).

The deployment configuration 125 might also define one or more conditions 132 that signal the success or failure of the deployment. The deployment configuration 125 might also provide other types of data for configuring a deployment in other configurations. In this regard, it should be appreciated that various mechanisms, such as web service APIs and CLIs, might be utilized to provide the deployment configuration 125 to the deployment service 108.

From operation 206, the routine 200 proceeds to operation 208, where a user of the development system 116 may upload the application revision 120 to the storage service 106 in the service provider network 102, to the source code repository 122, or to another network-accessible location. As discussed above, the location 126 specified in the deployment configuration 125 specifies the location of the application revision 120.

From operation 208, the routine 200 proceeds to operation 210, where the deployment service 108 utilizes the schedule 130 and/or other information contained in the deployment configuration 125 to select hosts 110 to which the application is to be deployed. When a host 110 is selected, the hosts 110 is instructed to obtain the application revision 120 from the specified location 126.

In turn, the host 110 obtains the application revision 120 and deploys the deployable content 122 contained therein. As discussed above, the host 110 might also perform one or more lifecycle events in conjunction with the deployment and/or execution of the application. The host 110 might also report the status of the deployment back to the deployment service 108 at various times during the deployment process. In this way, the deployment service 108 and/or the user that requested the deployment can check the results of the deployment at various times to ensure that the deployment is proceeding satisfactorily.

If it is necessary to redeploy the deployable content 122 for some reason or to deploy an update to the deployable content 122, the routine 200 may repeat operations 208-212 to perform another deployment. If no further deployment is required, the routine 200 may proceed from operation 212 to operation 214, where it ends. In this regard, it should be appreciated that it may not be necessary to repeat operations 202-208 in order to deploy an application revision 120 to a different deployment group. For example, the application revision 120 might first be deployed to a deployment group 114 used for testing. If the testing completes successfully, the same application revision 120 might then be deployed to a production deployment group 114 without repeating operations 202-2008 for creating the deployable content, creating the application specification, etc. Additional details regarding the deployment process, including the rolling back of a deployment, will be provided below.

Figure 3A:
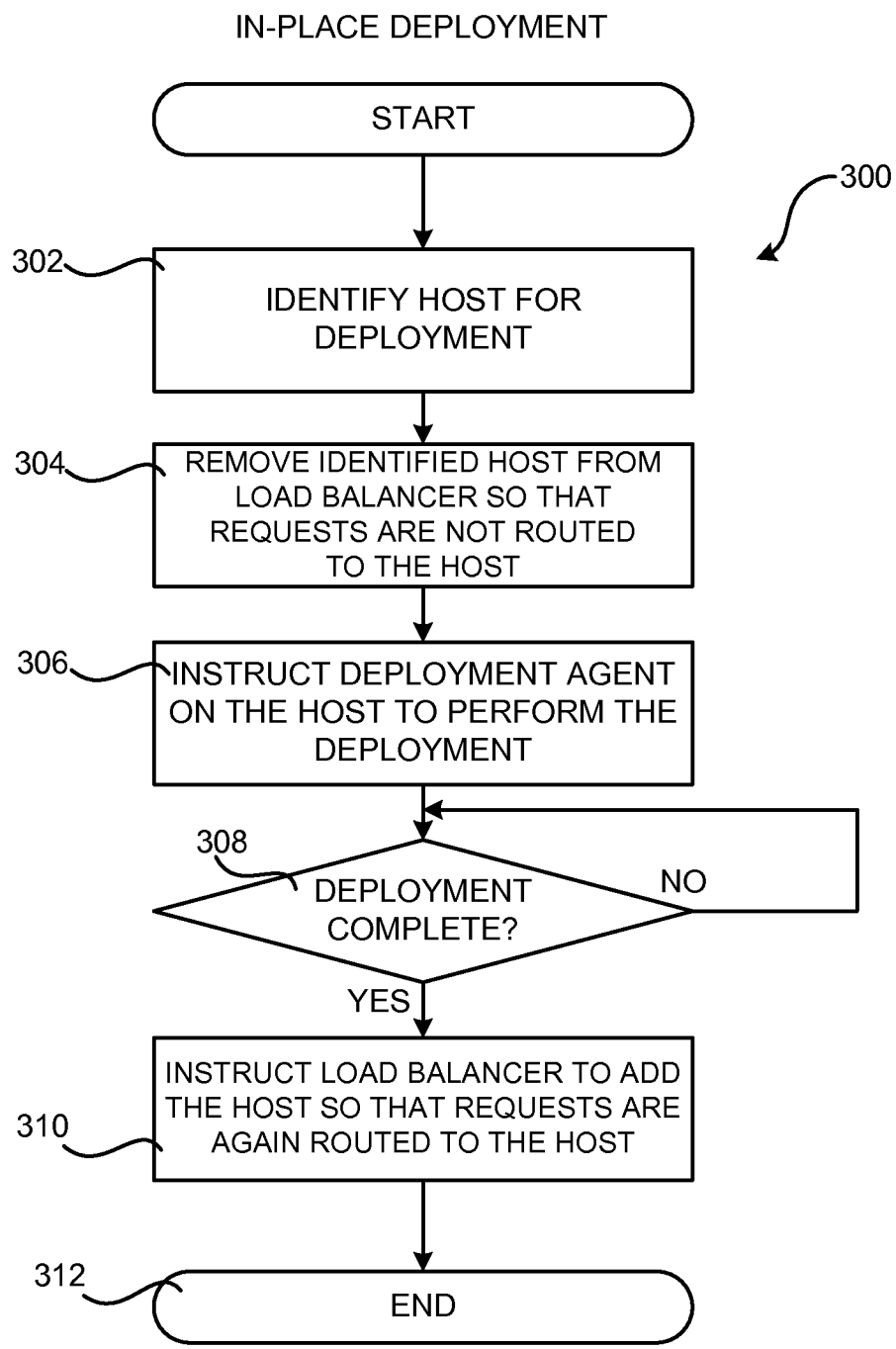
FIG. 3A is a flow diagram illustrating aspects of the operation of a deployment service for deploying applications to hosts in-place.

FIG. 3A is a flow diagram showing a routine 300 that illustrates aspects of the operation of the deployment service 108 for performing an in-place deployment of an application to a host 110. As discussed briefly above, an in-place deployment involves deploying program code directly to a host 110 in a deployment group 114 rather than creating a new host 110 for the deployment as in a replacement deployment. Additional details regarding replacement deployments will be provided below with regard to FIG. 3B.

The routine 300 begins at operation 300, where the deployment service 108 identifies a host 110 to which the deployable content 122 is to be deployed. As discussed above, the schedule 130 and/or other considerations might be utilized to select a particular host 110, or hosts 110, for deployment. Once a host 110 has been selected, the routine 300 proceeds to operation 304, where the host 110 to which the deployable content 122 is to be deployed is removed from a load balancer or other networking device or service that routes network traffic to the deployment group 114 containing the host 110. In some configurations, the deployment service 108 communicates directly with the networking device or service to perform this functionality. In other configurations, the application specification 124 includes a script or other type of program code that performs this function. This functionality might also be accomplished using other mechanisms in other configurations.

From operation 304, the routine 300 proceeds to operation 306, where the deployment service 108 instructs the host 110 to which the deployment content 122 is to be deployed to perform the deployment. As discussed above, various types of push or pull mechanisms might be utilized to provide this instruction to the host 110. Other mechanisms might also be utilized. In response to such an instruction, the host 110 obtains the application revision 120 from the location 126 and performs the deployment, including the performance of any lifecycle events specified in the application specification 124.

Once the deployment has completed, the routine 300 proceeds from operation 308 to operation 310. At operation 310, the load balancer or other networking device or service fronting the deployment group 114 is instructed to add the host 110 to which the deployment was performed. In this way, network traffic can be routed to the host 110 to which the deployment was performed. In some configurations, the deployment service 108 communicates directly with the networking device or service to perform this function. In other configurations, the application specification 124 includes a script or other type of program code that performs this function. This functionality might also be accomplished using other mechanisms in other configurations. From operation 310, the routine 300 proceeds to operation 312, where it ends.

Figure 3B:
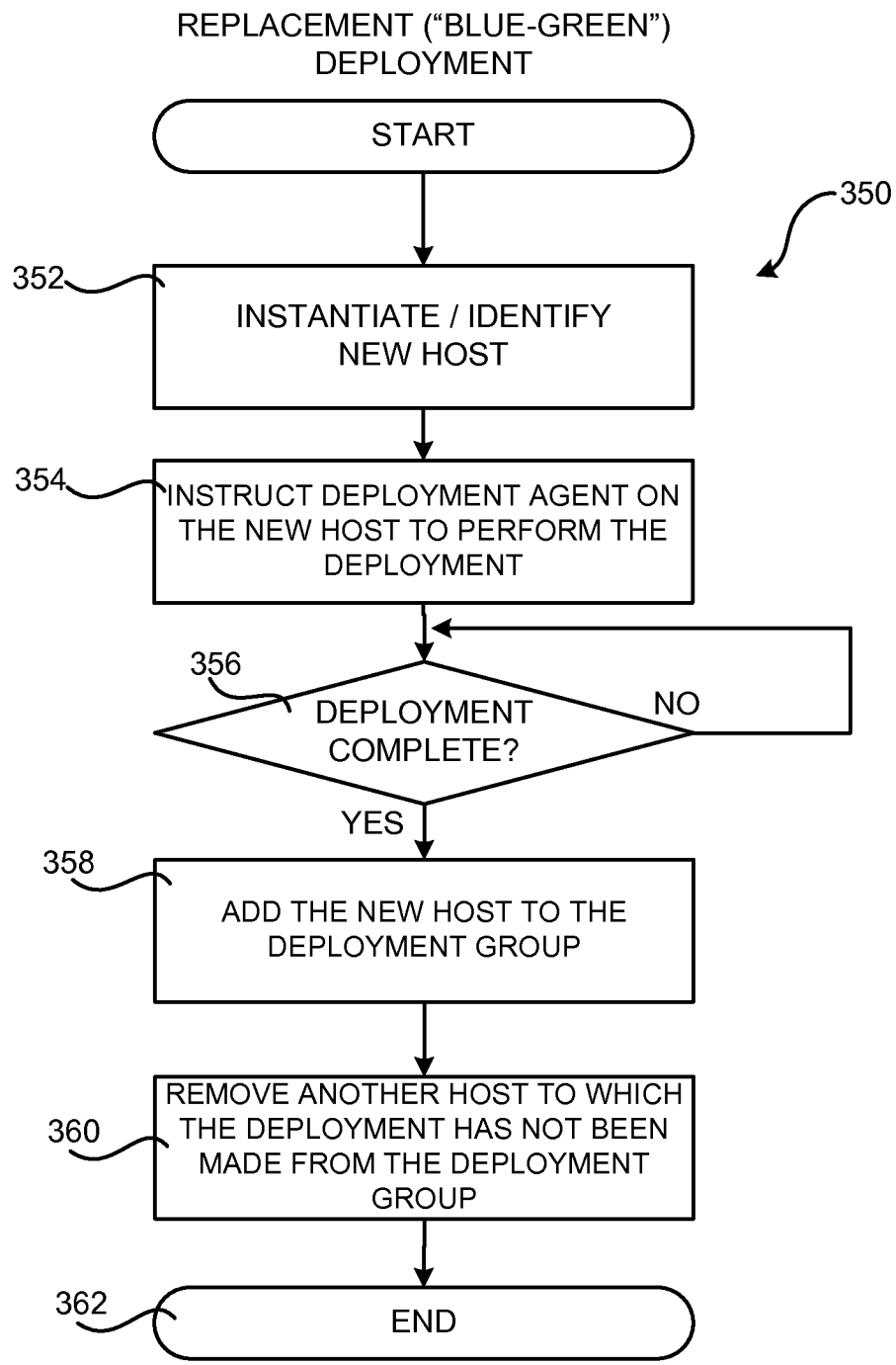
FIG. 3B is a flow diagram illustrating aspects of the operation of a deployment service for deploying applications to hosts using a replacement host.

FIG. 3B is a flow diagram showing a routine 350 that illustrates aspects of the operation of the deployment service 108 for performing a replacement deployment of an application to a host 110. The routine 350 begins at operation 352, where the deployment service 108, or another component or service, instantiates or identifies a new host 110 to which the deployment is to be performed. For example, in one particular configuration, the deployment service 108 might instruct the on-demand computing service 104 to instantiate a new virtual host 110 for receiving the deployment. In another configuration, a new physical host 110 might be made available for the deployment.

Once a new host 110 has been made available, the routine 350 proceeds to operation 354, where the deployment agent 112 is deployed to the new host 110 and instructed to perform the deployment. As discussed above, various types of push or pull mechanisms might be utilized to provide this instruction to the new host 110. Other mechanisms might also be utilized. In response to such an instruction, the new host 110 obtains the application revision 120 from the location 126 and performs the deployment, including the performance of any lifecycle events specified in the application specification 124.

Once the deployment has completed, the routine 350 proceeds from operation 356 to operation 358. At operation 358, the new host 110 is added to the deployment group 114. By adding the new host 110 to the deployment group 114, network traffic can be routed to the new host 110 to which the deployment was performed. Once the new host 110 has been added to the deployment group 114, the routine 350 may proceed to operation 360, where another host 110 may be removed from the deployment group 114. The host 110 removed from the deployment group 114 might be retained for some user-specified period of time for use in rolling back the deployment if necessary or desired. Additional details regarding this mechanism will be provided below with regard to FIG. 5A.

Using the replacement deployment mechanism described above, the deployment can be performed to a new host 110 and the new host can replace an existing host 110 in the deployment group 114. Consequently, by performing a replacement deployment for all of the hosts 110 in a deployment group 114, a deployment can be performed with minimal impact on the performance of the deployment group 114. From operation 360, the routine 350 proceeds to operation 362, where it ends.

Figure 4:
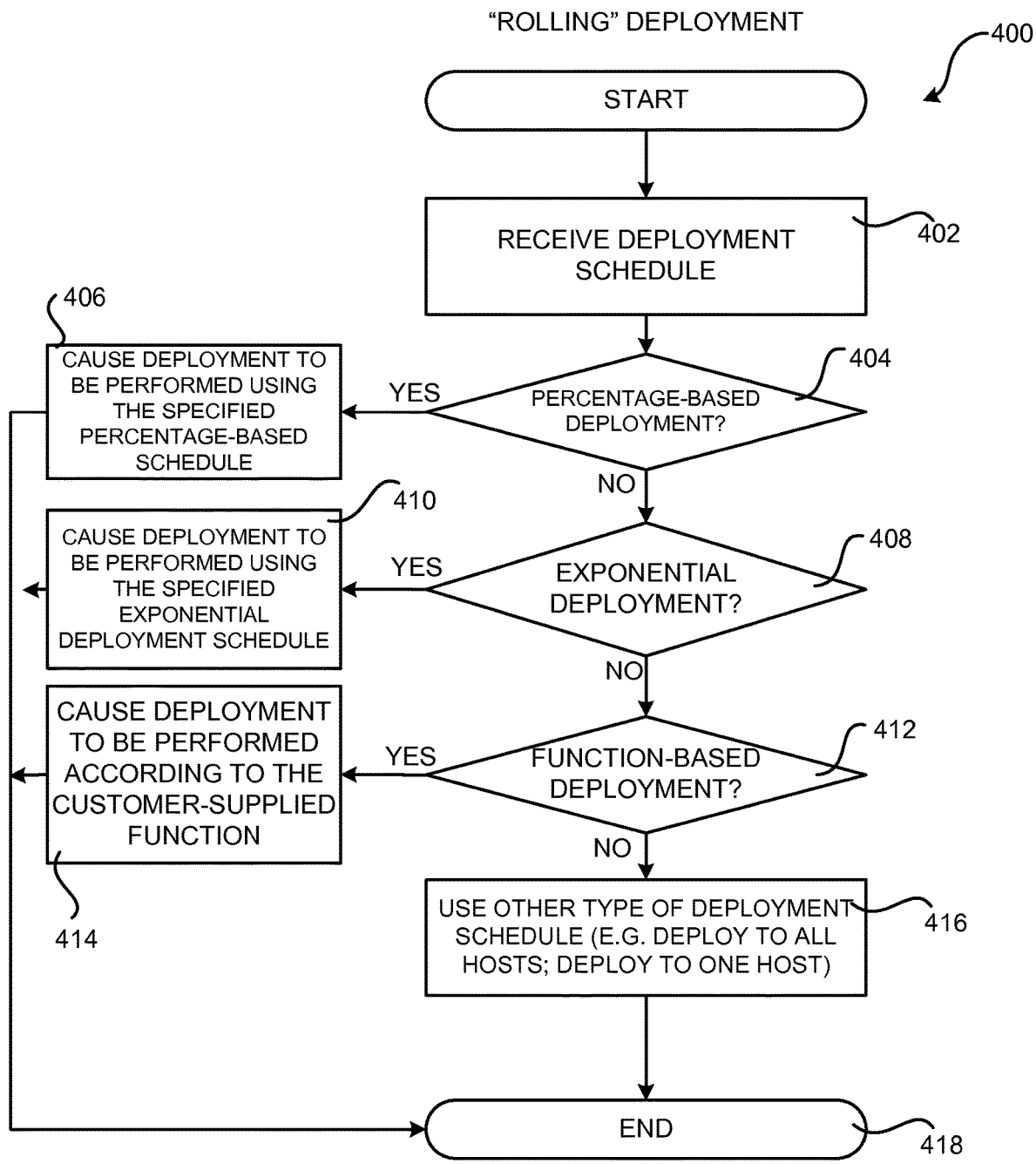
FIG. 4 is a flow diagram illustrating aspects of the operation of a deployment service for performing a rolling deploying of an application to hosts in a deployment group.

FIG. 4 is a flow diagram showing a routine 400 that illustrates aspects of the operation of the deployment service 108 for performing a rolling deploying of an application to hosts 110 in a deployment group 114. As discussed briefly above, in a rolling deployment an application is deployed to a subset of the hosts 110 in a deployment group 114 at a time. When deployment has completed to one subset of the hosts 110 in the deployment group 114, the deployment will continue to another subset of the hosts 110. This process will continue until the deployment has been performed to all of the hosts 110 in the deployment group 114. Additionally, and as described in detail below, the schedule 130 specified in the deployment configuration 125 may be utilized to determine how the hosts 110 in a deployment group 114 are to be selected for a rolling deployment. Additional details regarding this process are provided below.

The routine 400 begins at operation 402, where the deployment service 108 receives the schedule 130 for the deployment. As discussed above, the schedule 130 might be submitted to the deployment service 108 by way of an API or CLI. The routine 400 then proceeds to operation 404, where the deployment service 108 determines whether the schedule 130 specifies a percentage-based deployment. As discussed above, the schedule 130 might specify a percentage-based deployment wherein a rolling deployment of the application is performed to a percentage of the hosts 110 in a deployment group 114 at a time (e.g. 10%).

When the application has been successfully deployed to the specified percentage of hosts 110, the application will then be deployed to the next percentage of hosts 110 (i.e. the next 10% of the hosts) until the application has been deployed to all of the hosts 110 in the deployment group 114. If such a schedule 130 has been specified, the routine 400 proceeds from operation 404 to operation 406, where the deployment is performed in this manner. The routine 400 then proceeds from operation 406 to operation 418, where it ends.

If a percentage-based deployment has not been specified, the routine 400 proceeds from operation 404 to operation 408 where a determination is made as to whether the schedule 130 specifies an exponential deployment. As discussed above, an exponential deployment schedule allows the number of hosts 110 to which an application is deployed at a time to increase exponentially. If an exponential deployment has been specified, the routine 400 proceeds from operation 408 to operation 410, where the deployment is performed in this manner. The routine 400 then proceeds from operation 410 to operation 418, where it ends.

If neither a percentage-based or exponential deployment schedule has been specified, the routine 400 proceeds from operation 408 to operation 412. At operation 412, a determination is made as to whether the deployment schedule 130 specifies a function-based deployment. As discussed briefly above, a user of the deployment service 108 might specify an arbitrary mathematical function that defines the rate at which an application is to be deployed to subsets of hosts 110 in a deployment group 114. The deployment service 108 utilizes the specified function to perform the deployment. If a user-defined function-based deployment has been specified, the routine 400 proceeds from operation 412 to operation 414, where the deployment is performed to the hosts 110 in the deployment group 114 according to the user-defined function. The routine 400 then proceeds from operation 414 to operation 418, where it ends.

If neither a percentage-based, exponential or function-based deployment has been specified, the routine 400 proceeds from operation 412 to operation 416. At operation 416, the deployment might be performed according to another type of user-defined schedule 130. For example, and without limitation, the application might be deployed to all of the hosts 110 in a deployment group 114 at a time. Alternately, the application might be deployed to one host 110 in the deployment group at a time. Other schedules 130 for deploying an application to the hosts 110 in a deployment group might also be utilized.

As discussed briefly above, a schedule 130 might also be defined that specifies confidence intervals that increase the number of hosts 110 to which the application is deployed based upon a confidence level of the deployment. In this way, deployment might start with a small number of hosts 110 and increase the number of hosts 110 to which the application is deployed at a time if the deployment is successful. Confidence intervals might also be utilized in other ways to accelerate (or decelerate) the number of hosts 110 to which an application is to be deployed based upon the confidence in previous deployments of the application. From operation 416, the routine 400 proceeds to operation 418, where it ends.

Figure 5A:
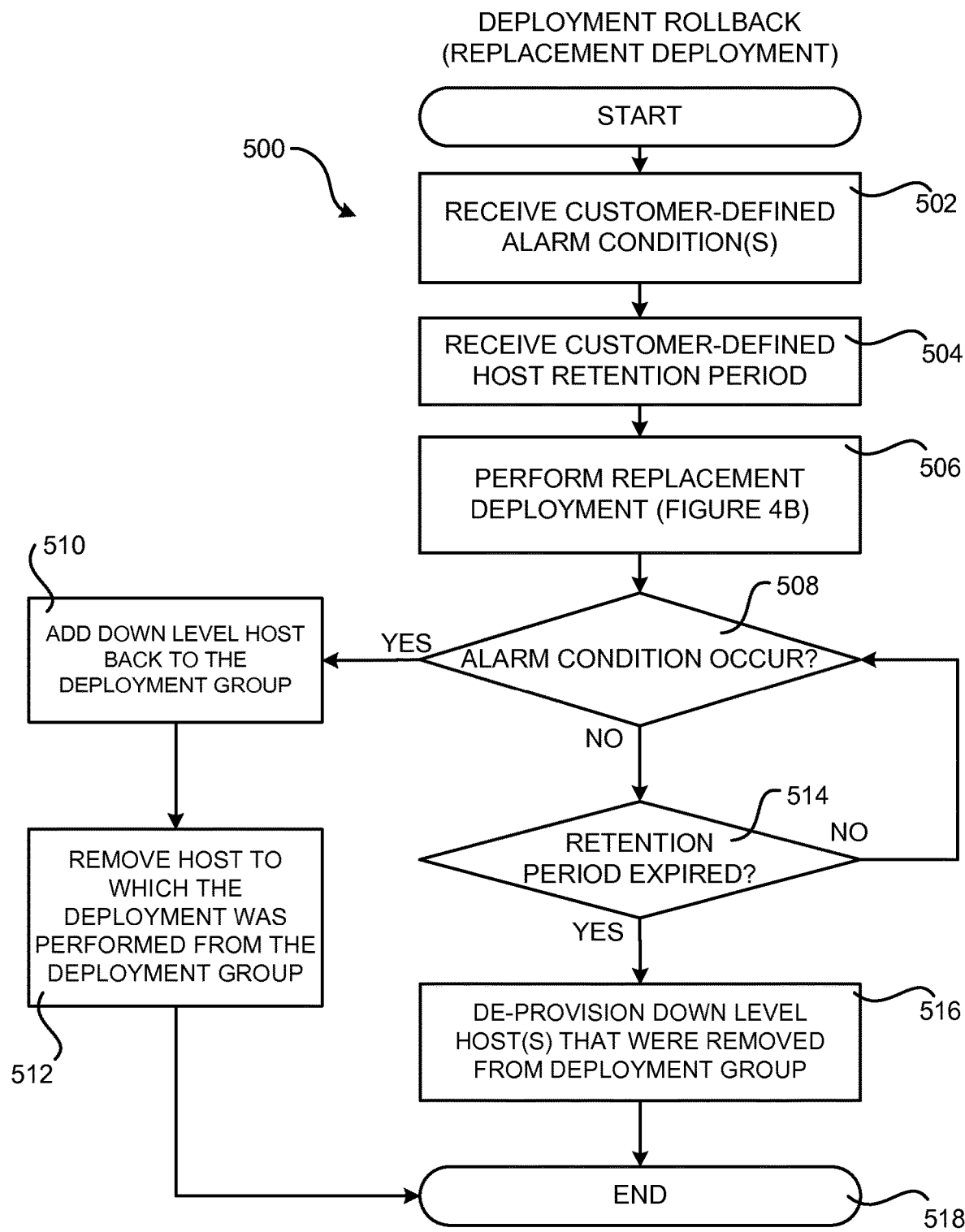
FIG. 5A is a flow diagram illustrating the operation of a deployment service for rolling back the deployment of an application to a host when a replacement deployment was performed to the host.

FIG. 5A is a flow diagram showing a routine 500 that illustrates the operation of the deployment service 108 for rolling back the deployment of an application to a host 110 following a replacement deployment to the host 110. As discussed briefly above, when a replacement deployment is performed, hosts 110 might be removed from a deployment group 114. In this case, the hosts 110 may be retained (i.e. not de-provisioned) for a user-specified period of time following the deployment and utilized to roll back the deployment if the deployment is unsuccessful or one or more other user-defined alarm conditions occur. Additional details regarding this process are provided below with reference to FIG. 5A.

The routine 500 begins at operation 502, where the deployment service 108 might receive one or more customer-defined failure conditions 132 (which might also be referred to as "alarm conditions"). The failure conditions 132 define conditions under which a deployment of an application to hosts 110 in a deployment group 114 should be rolled back (i.e. restore the hosts 110 to the state they were in just prior to the deployment). Various systems and/or services in the service provider network 102 along with the hosts 110 themselves might be utilized to monitor for the occurrence of the alarm conditions.

From operation 502, the routine 500 proceeds to operation 504, where the deployment service 108 might also receive a customer-defined retention period for hosts 110 that are removed from a deployment group 114 as a part of a replacement deployment. The retention period might specify, for example, that hosts 110 removed from a deployment group 114 in conjunction with a replacement deployment of an application are to be retained for five days or other period of time following the completion of the deployment.

From operation 504, the routine 500 proceeds to operation 506, where a replacement deployment is performed to hosts 110 in a deployment group 114 in the manner described above with regard to FIG. 4B. The routine 500 then proceeds to operation 508, where a determination is made as to whether one of the customer-specified alarm conditions has occurred.

If an alarm condition has occurred, the routine 500 proceeds from operation 508 to operation 510, where one or more hosts 110 that were removed from the deployment group 114 as part of the replacement deployment are added back to the deployment group 114 (e.g. added back to the load balancer or service that fronts the deployment group 114). The routine 500 then proceeds from operation 510 to operation 512, where the hosts 110 to which the application was deployed are removed from the deployment group 114 (e.g. removed from the load balancer or network service that fronts the deployment group 114). The removed hosts might also be de-provisioned following removal from the deployment group 114. In this way, the hosts 110 to which the deployment was performed can be quickly removed from the deployment group 114 and the hosts 110 that were removed from the deployment group 114 as part of the deployment can be returned to the deployment group 114. From operation 512, the routine 500 proceeds to operation 518, where it ends.

If, at operation 508, it is determined that an alarm condition has not occurred, the routine 500 proceeds to operation 514. At operation 514, a determination is made as to whether the user-specified retention period has expired following completion of the deployment at operation 506. If the retention period has not expired, the routine 500 proceeds from operation 514 to operation 508. If the retention period has expired, the routine 500 proceeds from operation 514 to operation 516. At operation 516, hosts 110 removed from the deployment group 114 as part of the replacement deployment may be de-provisioned. For example, a virtual host 110 might be destroyed. Other types of hosts 110 might be de-provisioned in different ways. The routine 500 then continues from operation 516 to operation 518, where it ends.

Figure 5B:
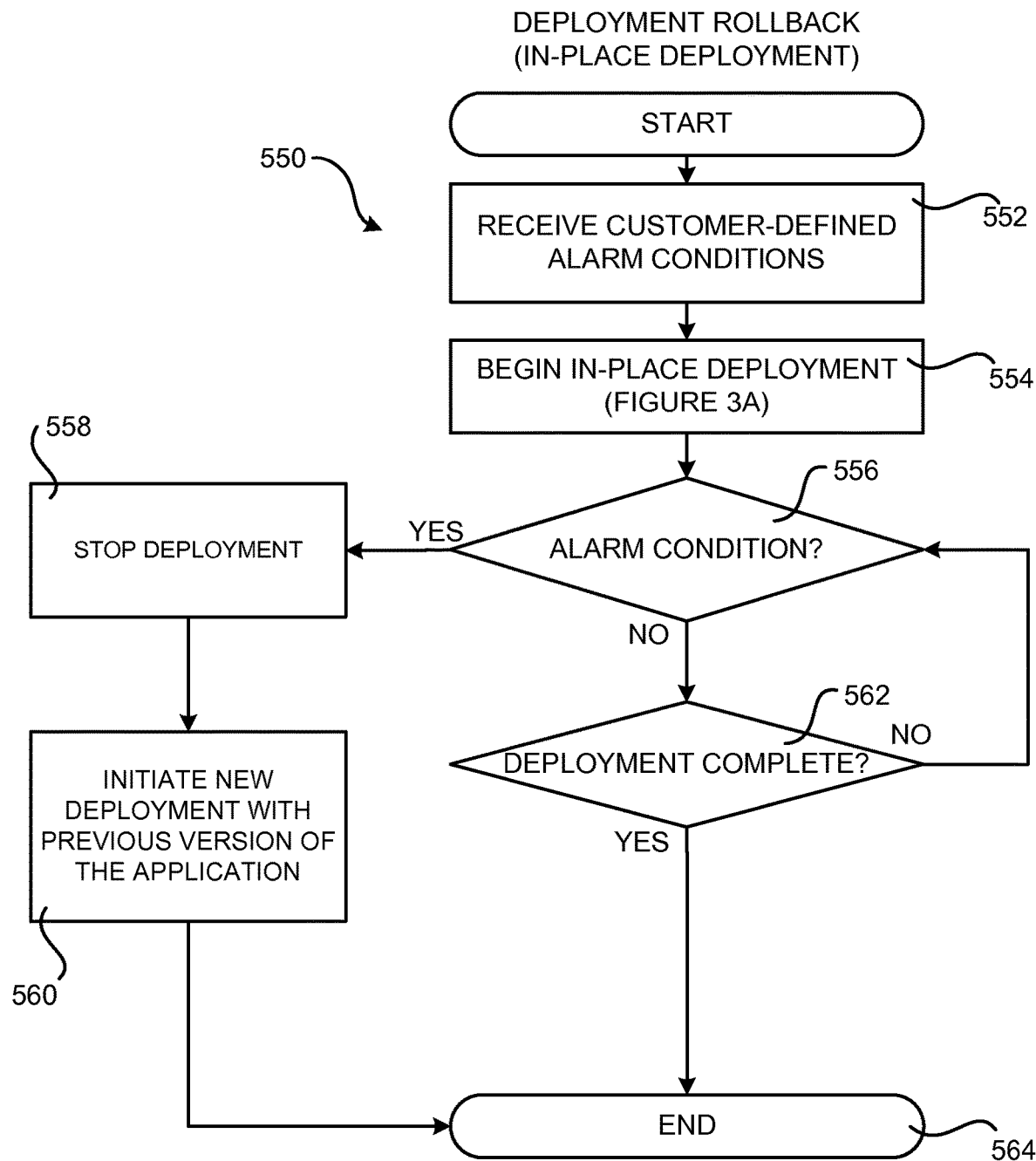
FIG. 5B is a flow diagram illustrating the operation of a deployment service for rolling back the deployment of an application to a host when an in-place deployment was performed to the host.

FIG. 5B is a flow diagram showing a routine 550 that illustrates the operation of the deployment service 108 for rolling back the deployment of an application to a host 110 when an in-place deployment has been performed to the host 110. As discussed above, a new host 110 is not created during an in-place deployment, but rather, deployment is performed directly on hosts 110 in the deployment group 114. Additional details regarding rolling back this type of deployment will be provided below with regard to FIG. 5B.

The routine 550 begins at operation 552, where one or more customer-defined alarm conditions might be received in the manner described above. The routine 550 then proceeds from operation 552 to operation 554, where an in-place deployment of hosts 110 in a deployment group 114 is started in the manner described above with regard to FIG. 3A. The routine 550 then proceeds from operation 554 to operation 556, where a determination is made as to whether one or more of the user-specified alarm conditions has occurred. If an alarm condition has occurred, the routine 550 proceeds from operation 556 to operation 558.

At operation 558, the in-progress deployment is stopped. For example, and without limitation, the deployment service 108 might instruct the hosts 110 involved in the deployment to discontinue any further processing of the deployment. From operation 558, the routine 550 then proceeds to operation 560, where the deployment service 108 instructs the hosts 110 involved in the deployment to begin a new in-place deployment with the previous version of the application. In this way, a deployment can be stopped and the deployment can be rolled back to the previous version of the application in response to the detection of an alarm condition. From operation 560, the routine 550 proceeds to operation 564, where it ends.

If, at operation 556, it is determined that no alarm condition has occurred, the routine 550 proceeds from operation 556 to operation 562. At operation 562, a determination is made as to whether the deployment has completed. If the deployment has not completed, the routine 550 proceeds back to operation 556, where another determination might be made as to whether an alarm condition has occurred during the deployment. If it is determined at operation 562 that the deployment has completed, the routine 550 proceeds from operation 562 to operation 564, where it ends.

Figure 6:
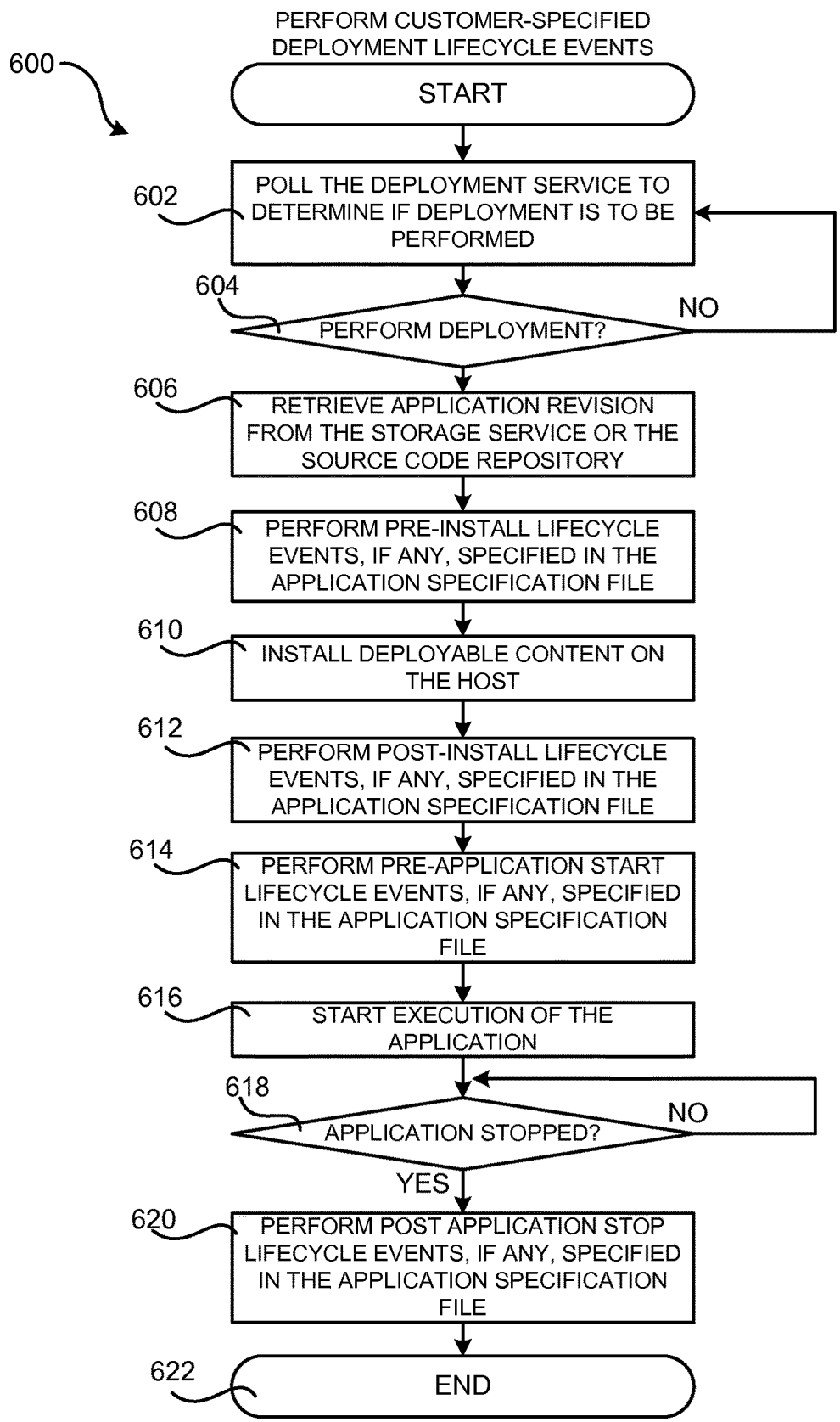
FIG. 6 is a flow diagram illustrating aspects of the operation of a deployment agent executing on a host for performing customer-specified deployment lifecycle events.

FIG. 6 is a flow diagram showing a routine 600 that illustrates aspects of the operation of a deployment agent 112 executing on a host 110 for performing customer-specified deployment lifecycle events. As discussed briefly above, a user of the deployment service 108 might define one or more lifecycle events to be performed in conjunction with the deployment and/or execution of an application. In one configuration, the lifecycle events are defined as scripts in the application specification 124 contained in the application revision 120. The lifecycle events might be defined as other types of program code in other ways in other configurations. Additional details regarding the performance of the lifecycle events are provided below with reference to FIG. 6.

The routine 600 begins at operation 602, where an instance of the deployment agent 112 executing on a host 110 polls the deployment service 108 to determine whether a deployment is to be performed. As mentioned above, a push mechanism might be utilized in other configurations to instruct a host 110 that a deployment is to be performed. If a deployment is to be performed, the routine 600 proceeds from operation 604 to operation 606.

At operation 606, the instance of the deployment agent 112 retrieves the application revision 120 from the location 126 specified in the deployment configuration 125. The routine 600 then proceeds from operation 606 to operation 608 where the deployment agent 112 performs any pre-installation lifecycle events (e.g. scripts) specified in the application specification 124. The routine 600 then proceeds from operation 608 to operation 610, where the deployable content 122 in the application revision 120 is deployed to the host 110.

From operation 610, the routine 600 proceeds to operation 612, where the deployment agent 112 performs any post-installation lifecycle events specified in the application specification 124. The routine 600 then proceeds to operation 614, where any pre-execution lifecycle events specified in the application specification 124 are also performed. Once any pre-execution lifecycle events have been performed, the routine 600 proceeds from operation 614 to operation 616 where execution of the deployed application may be started.

From operation 616, the routine 600 proceeds to operation 618, where a determination is made as to whether the execution of the deployed application has been stopped. If execution of the application has been stopped, the routine 600 proceeds from operation 618 to operation 620, where any post application stop lifecycle events specified in the application specification 124 are performed. The routine 600 then proceeds to operation 622, where it ends. It should be appreciated that the various lifecycle events described above are merely illustrative and that other lifecycle events might be defined for performance by the hosts 110 and/or other systems and/or services within or external to the service provider network 102 at other times during the deployment and/or execution of an application.

Figure 7:
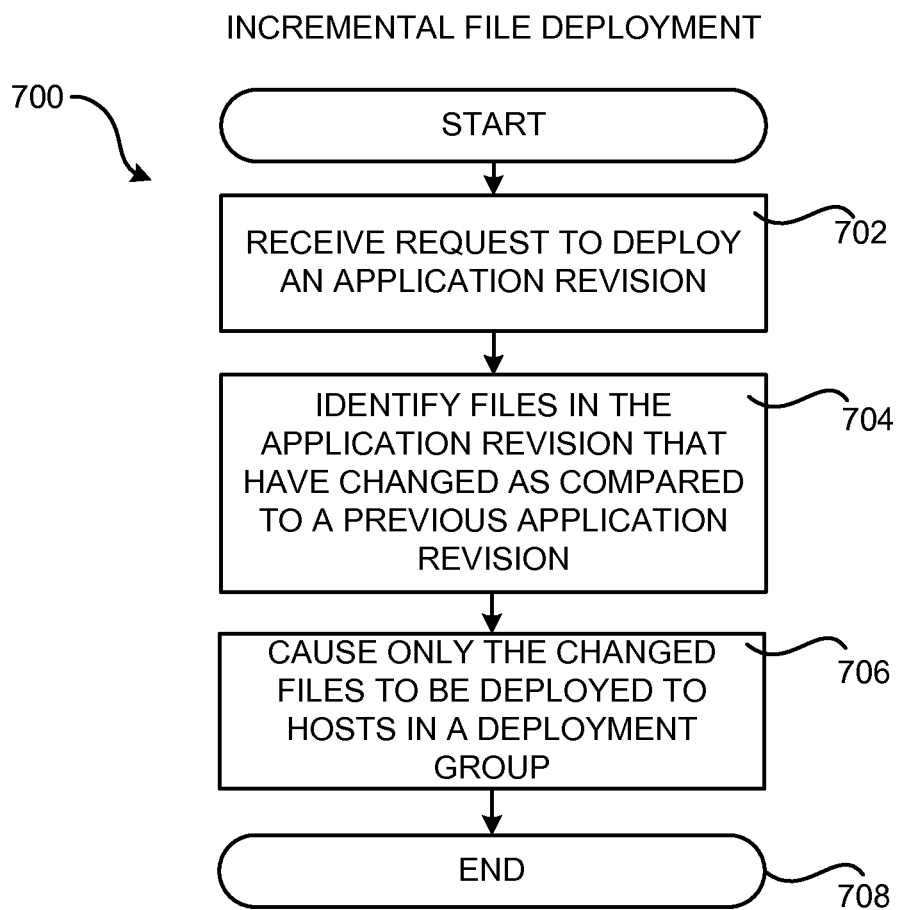
FIG. 7 is a flow diagram illustrating aspects of the operation of a deployment service for performing an incremental file deployment, according to one configuration.

FIG. 7 is a flow diagram showing a routine 700 that illustrates aspects of the operation of the deployment service 108 for performing an incremental file deployment in one particular configuration. As discussed briefly above, in some configurations the application revision 120 is defined such that the deployable content 122 contains only files that have changed as compared to a previous version of the application. In this way, only the files that need to be updated on a host 110 are transferred to the storage service 105 or external source code repository 122 and, subsequently, to the hosts 110 in a deployment group 114 for deployment. This configuration can save significant network bandwidth during deployment, especially where a large application is deployed to a large number of geographically disparate hosts 110. Additional details regarding this process are provided below with regard to FIG. 7.

The routine 700 begins at operation 702, where a customer utilizes the deployment system 116 to submit a request to deploy an application to the deployment service 108. The request might come in the form of the deployment configuration 125, for example. In response to receiving such a request, the routine 700 proceeds from operation 702 to operation 704, where the deployment service 108, or another system or service, identifies files in the deployable content 122 of the application revision 120 that have changed since the previous deployment of the application. For example, and without limitation, the deployment service 108 might communicate with a source code repository 122 to determine the files that have changed. Alternately, the deployment service 108 might maintain a cache of previously deployed application revisions 120 and utilize the revisions 120 stored in the cache to identify the files that have changed. Other mechanisms might be utilized to identify those files that have changed since the previous deployment.

Once the changed files have been identified, the routine 700 proceeds from operation 704 to operation 706, where the deployment service 108 causes a deployment to be performed to the hosts 110 in a deployment group 114 of only the changed files identified at operation 704. For example, the deployment service 108 might provide the instances of the deployment agent 112 executing on the hosts 110 with the location of an application revision 120 that contains only the changed files identified at operation 704. The changed files are then deployed to the hosts 110 in the manner described above. The routine 700 then proceeds from operation 706 to operation 708, where it ends.

Figure 8:
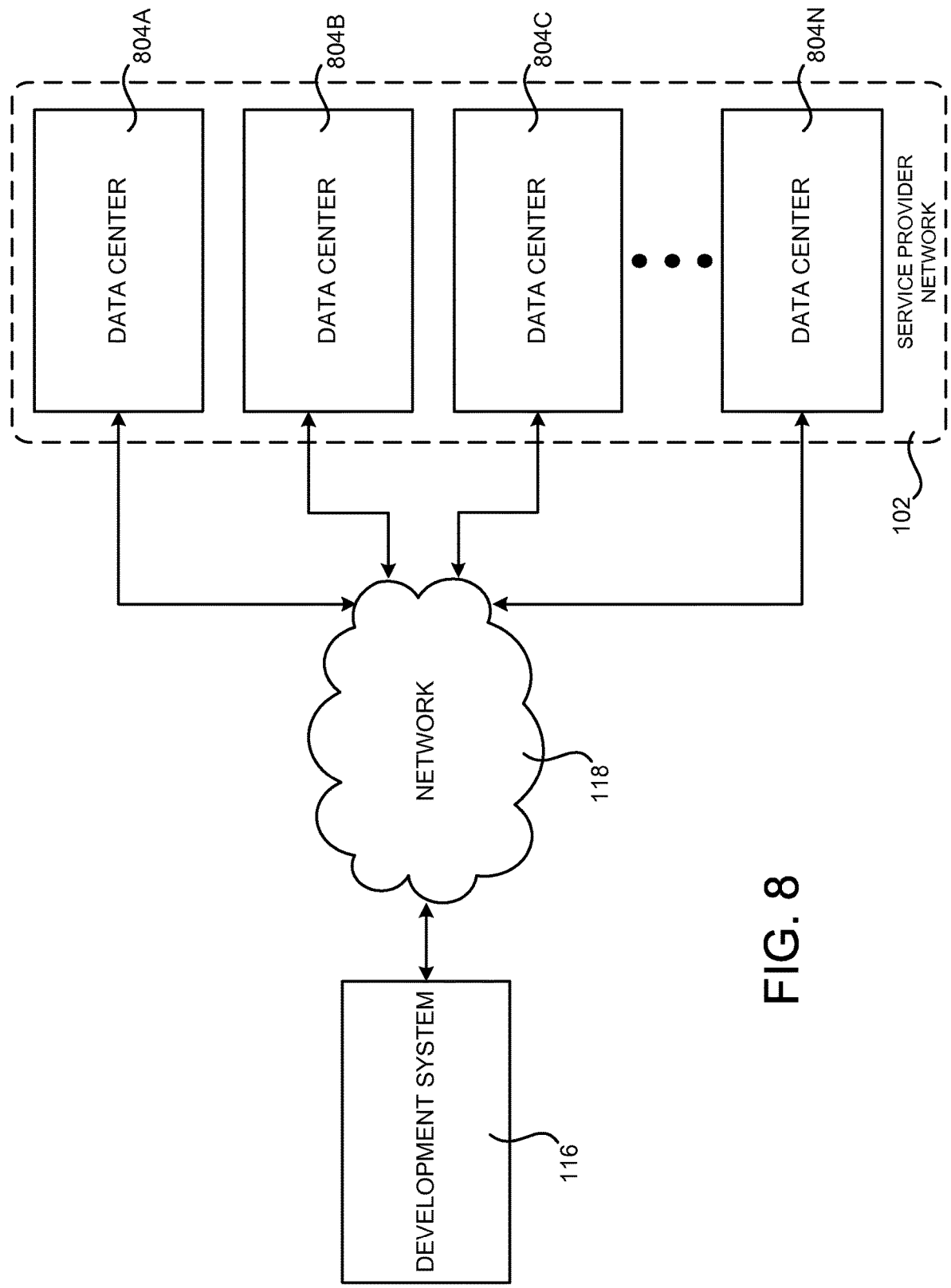
FIG. 8 is a system and network diagram that shows an illustrative operating environment that includes a service provider network that may be configured to implement aspects of the functionality described herein.

FIG. 8 is a system and network diagram that shows one illustrative operating environment for the configurations disclosed herein that includes a service provider network 102 that may be configured to provide a deployment service 108 in the manner described above, according to one configuration disclosed herein. As discussed briefly above, the service provider network 102 can provide computing resources on a permanent or an as-needed basis.

The computing resources provided by the service provider network 102 may include various types of computing resources, such as data processing resources, data storage resources, networking resources, data communication resources, and the like. Each type of computing resource may be general-purpose or may be available in a number of specific configurations. For example, and as described briefly above with regard to FIG. 1A, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. As discussed briefly above, the service provider network 102 might also be configured to provide other types of network services.

The computing resources provided by the service provider network 102 are enabled in one implementation by one or more data centers 804A-804N (which may be referred herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 might also be located in geographically disparate locations. One illustrative configuration for a data center 804 that implements some of the technologies disclosed herein for providing a deployment service 108 within the service provider network 102 will be described below with regard to FIG. 8.

The customers and other users of the service provider network 102 may access the computing resources provided by the service provider network 102 over a network 118, such as a wide area network ("WAN"). For example, and without limitation, a development system 116 operated by a customer or other user of the service provider network 102 might be utilized to access the service provider network 102 by way of the network 118. It should be appreciated that a local-area network ("LAN"), the Internet, or any other networking topology known in the art that connects the data centers 804 to remote customers and other users may be utilized. It should also be appreciated that combinations of such networks might also be utilized.

Figure 9:
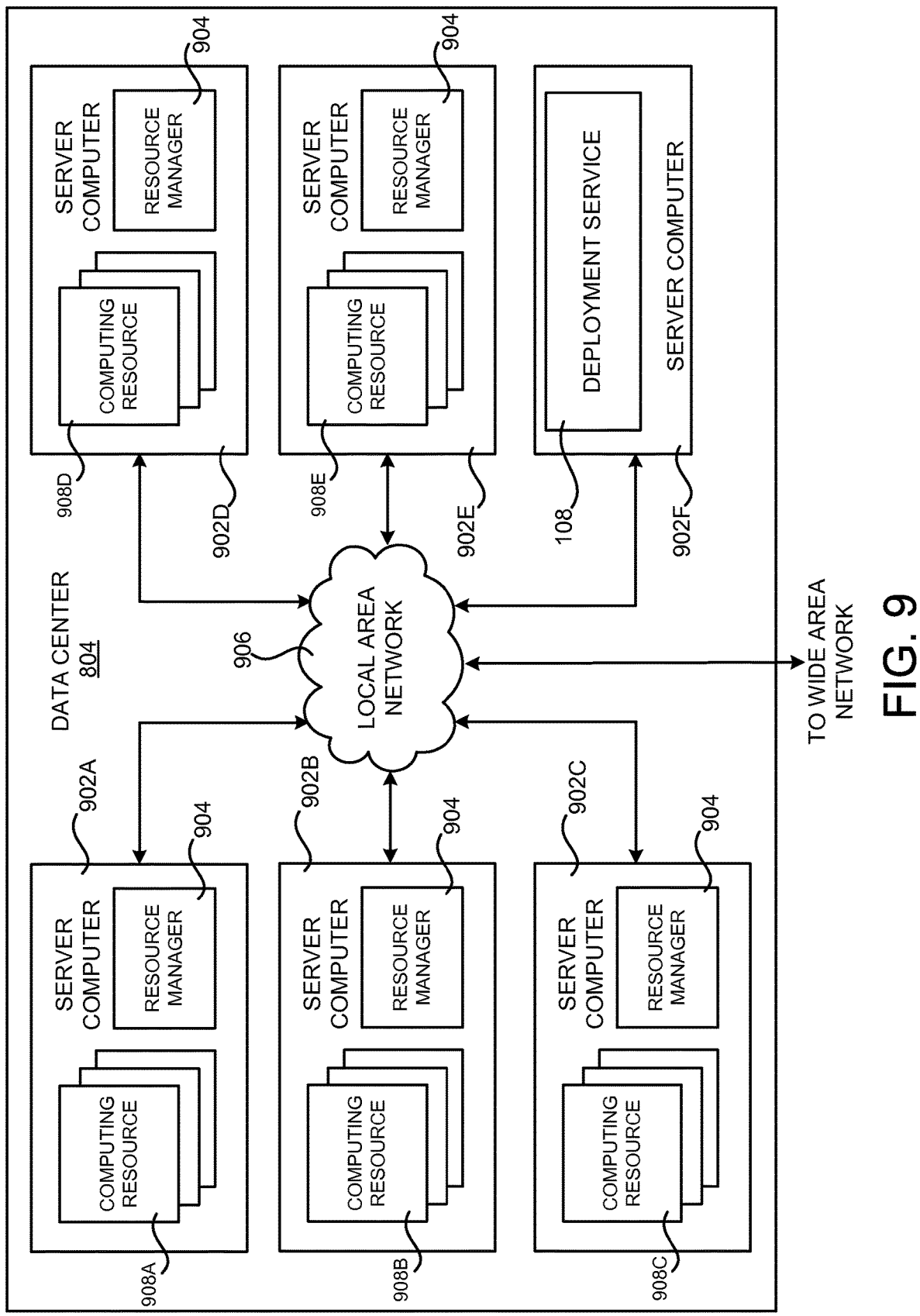
FIG. 9 is a computing system diagram that illustrates a configuration for a data center that may be utilized to implement aspects of the technologies disclosed herein.

FIG. 9 is a computing system diagram that illustrates one configuration for a data center 804 that implements aspects of the concepts and technologies disclosed herein providing a deployment service 108, according to one configuration disclosed herein. The example data center 804 shown in FIG. 9 includes several server computers 902A-902F (which may be referred to herein singularly as "a server computer 902" or in the plural as "the server computers 902") for providing computing resources 908A-908E.

The server computers 902 may be standard tower, rack-mount, or blade server computers configured appropriately for providing the computing resources described herein. As mentioned above, the computing resources might be data processing resources such as virtual machine instances or hardware computing systems, data storage resources, database resources, networking resources, and others. Some of the servers 902 might also be configured to execute a resource manager 904 capable of instantiating and/or managing the computing resources. In the case of virtual machine instances, for example, the resource manager 904 might be a hypervisor or another type of program configured to enable the execution of multiple virtual machine instances on a single server 902. Server computers 902 in the data center 804 might also be configured to provide network services and other types of services, some of which are described in detail below with regard to FIG. 10.

The data center 804 shown in FIG. 8 also includes a server computer 902F that may be utilized for executing some or all of the software components described above. For example, and without limitation, the server computer 902F might be configured to execute the deployment service 108, which has been described in detail above. The server computer 902F might also be configured to execute other components and/or store data for providing some or all of the functionality described herein.

In the example data center 804 shown in FIG. 9, an appropriate LAN 906 is also utilized to interconnect the server computers 902A-902F. The LAN 906 is also connected to the network 118 illustrated in FIG. 8. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 804A-804N, between each of the server computers 902A-902F in each data center 804, and, potentially, between computing resources in each of the data centers 804. It should be appreciated that the configuration of the data center 804 described with reference to FIG. 9 is merely illustrative and that other implementations might be utilized.

Figure 10:
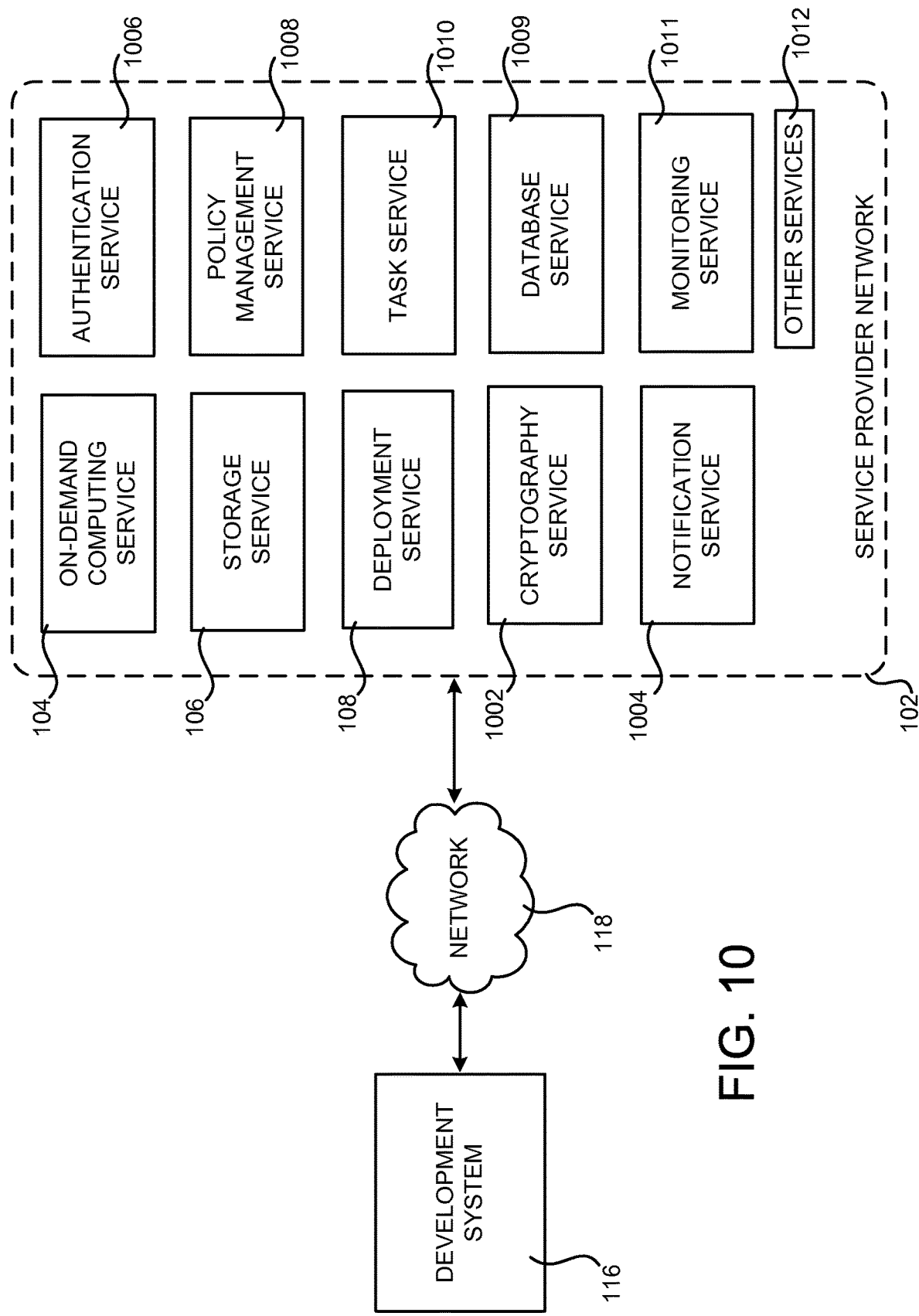
FIG. 10 is a system and network diagram that shows aspects of several services that might be provided by and utilized within a service provider network in one configuration disclosed herein.

FIG. 10 is a system and network diagram that shows aspects of several services that might be provided by and utilized within a service provider network 102 in one configuration disclosed herein. In particular, FIG. 10 shows an example of a development system 116 connected to the service provider network 102 through a network 118 in one example. As discussed briefly above, the service provider network 102 may provide a variety of services to customers of the service provider network 102, including but not limited to, the on-demand computing service 104, the storage service 106, and the deployment service 108 described above. The service provider network 102 might also provide other types of services, some of which are described in greater detail below.

It should be appreciated that customers of the service provider network 102 may include organizations or individuals that utilize some or all of the services provided by the service provider network 102. As shown in FIG. 10, a customer may communicate with the service provider network 102 through a network 118, which may be a communication network, such as the Internet, an intranet or an Internet service provider ("ISP") network or a combination of such networks. Communications from the development system 116 to the service provider network 102 may cause the services provided by the service provider network 102 to operate in accordance with the described configurations or variations thereof.

The services provided by the service provider network 102, in the example shown in FIG. 10 may further include a cryptography service 1002, a notification service 1004, an authentication service 1006, a policy management service 1008, a task service 1010 and, potentially, other services 1012. The service provider network 102 might also provide the deployment service 108 for use internally and by external customers in the manner described above.

It is noted that not all configurations described include the services described with reference to FIG. 10 and additional services may be provided in addition to or as an alternative to services explicitly described. Each of the services shown in FIG. 10 might also expose web service interfaces that enable a caller to submit appropriately configured API calls to the various services through web service requests. In addition, each of the services may include service interfaces that enable the services to access each other (e.g., to enable a virtual computer system provided by the on-demand computing service 104 to store data in or retrieve data from the data storage service 106). Additional details regarding some of the services shown in FIG. 10 will now be provided.

The on-demand computing service 104 may be a collection of computing resources configured to instantiate virtual machine instances. For example, a customer of the service provider network 102 may interact with the on-demand computing service 104 (via appropriately configured and authenticated API calls) to provision and operate virtual computer systems that are instantiated on physical computing devices hosted and operated by the service provider network 102. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the on-demand computing service 104 is shown in FIG. 10, any other computer system or computer system service may be utilized in the service provider network 102, such as a computer system or computer system service that does not employ virtualization and instead provisions computing resources on dedicated or shared computers/servers and/or other physical devices.

The storage service 106 might include software and computing resources that collectively operate to store data using block or file-level storage devices (and/or virtualizations thereof). The storage devices of the storage service 106 might, for instance, be operationally attached to virtual computer systems provided by the on-demand computing service 104 to serve as logical units (e.g., virtual drives) for the computer systems. A storage device might also enable the persistent storage of data used/generated by a corresponding virtual computer system where the virtual computer system service might only provide ephemeral data storage.

The service provider network 102 may also include a cryptography service 1002. The cryptography service 1002 may utilize storage services of the service provider network 102, such as the storage service 106, to store encryption keys in encrypted form, whereby the keys may be usable to decrypt customer keys accessible only to particular devices of the cryptography service 1002. The cryptography service 1002 might also provide other types of functionality not specifically mentioned herein.

The service provider network 102 might also provide a notification service 1004 in some configurations. The notification service 1004 may comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol ("HTTP"), e-mail and short message service ("SMS"), among others). The notification service 1004 might also provide notifications to clients using a "push" mechanism without the need to periodically check or "poll" for new information and updates. The notification service 1004 may further be used for various purposes such as monitoring applications executing in the on-demand computing service 104, workflow systems, time-sensitive information updates, mobile applications, and many others.

As illustrated in FIG. 9, the service provider network 102, in various configurations, also includes an authentication service 1006 and a policy management service 1008. The authentication service 1006, in one example, is a computer system (i.e., collection of computing resources) configured to perform operations involved in authentication of users. For instance, one of the services shown in FIG. 10 may provide information from a user to the authentication service 1006 to receive information in return that indicates whether or not the requests submitted by the user are authentic.

The policy management service 1008, in one example, is a computer system configured to manage policies on behalf of customers or internal users of the service provider network 102. The policy management service 1008 may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 1010. The task service 1010 is configured to receive a task package and to enable executing tasks and/or the performance of other types of workflows as dictated by the task package. The task service 1010 may be configured to use any resource of the service provider network 102, such as instantiated virtual machines or virtual hosts, for executing the task. The task service 1010 may configure the instantiated virtual machines or virtual hosts to operate using a selected operating system and/or a selected execution application in accordance with specified requirements.

The service provider network 102 might also provide a database service 1109 for providing network-accessible database services. The service provider network 102 might also provide a monitoring service 1011. The monitoring service 1011 provides functionality for monitoring aspects of the operation of devices and/or services operating in the service provider network 102. For example, and without limitation, the monitoring service 1011 might be utilized to determine whether any of the customer-specified failure conditions 132 have occurred.

The service provider network 102 may additionally maintain other services 1012 based, at least in part, on the needs of its customers. For instance, the service provider network 102 may maintain a database service (not shown in FIG. 10) in some configurations. A database service may be a collection of computing resources that collectively operate to create, maintain, and allow queries to be performed on databases stored within the service provider network 102. For example, a customer of the service provider network 102 may operate and manage a database from the database service by utilizing appropriately configured network API calls. This, in turn, may allow the customer to maintain and potentially scale the operations in the database. Other services include object-level archival data storage services, and services that manage and/or monitor other services. The service provider network 102 might also be configured with other services not specifically mentioned herein in other configurations.

Figure 11:
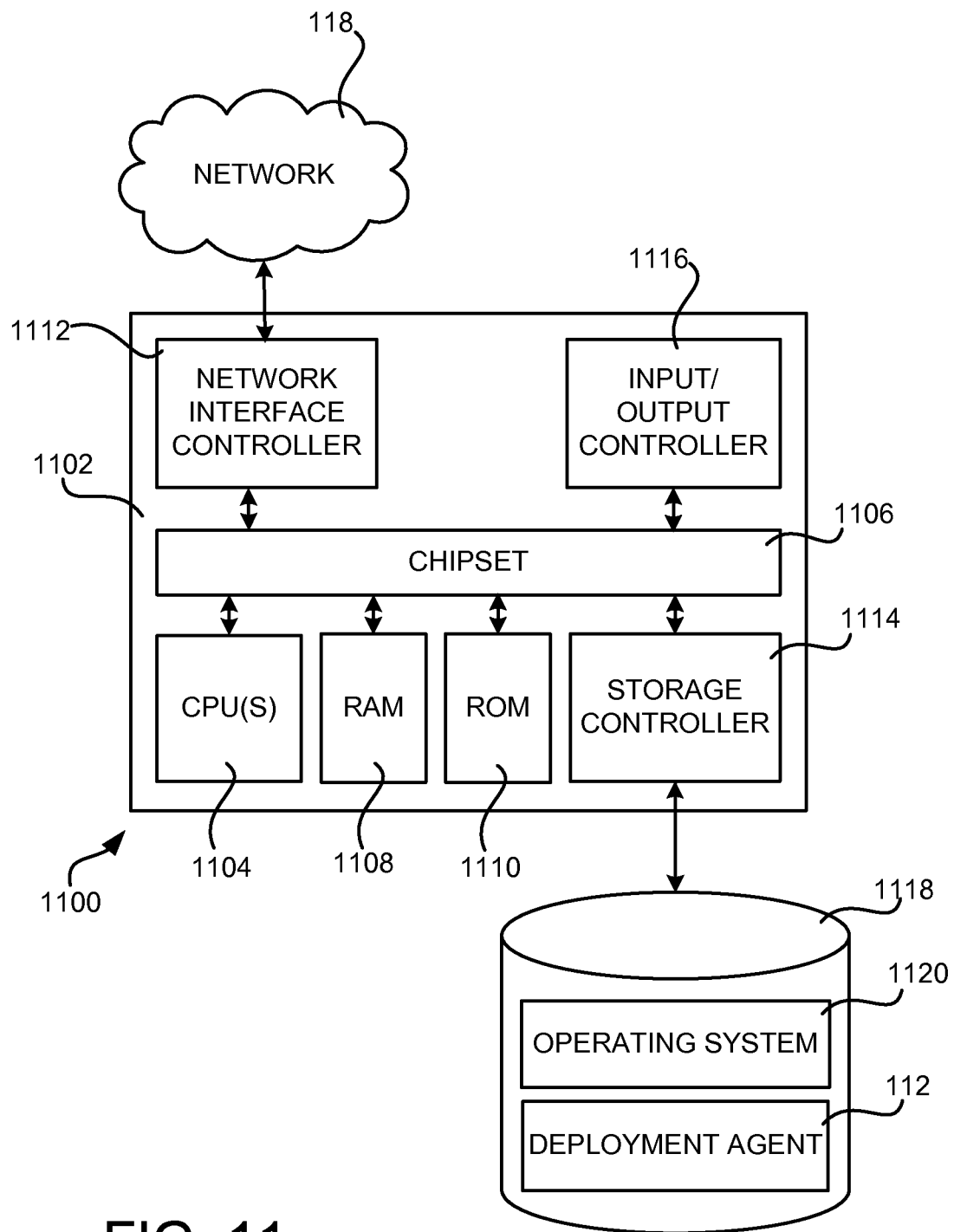
FIG. 11 is a computer architecture diagram showing an illustrative computer hardware architecture for implementing a computing device that might be utilized to implement aspects of the various technologies presented herein.

FIG. 11 shows an example computer architecture for a computer 1100 capable of executing program components for implementing various aspects of the functionality described above. The computer architecture shown in FIG. 11 illustrates a conventional server computer, workstation, desktop computer, laptop, tablet, network appliance, e-reader, smartphone, or other computing device, and may be utilized to execute any of the software components presented herein. For example, the computer architecture shown in FIG. 11 may be utilized to execute software components for providing the deployment service 108 and/or related functionality. The computer architecture shown in FIG. 11 might also be utilized to implement a host 110 or any other of the computing systems described herein.

The computer 1100 includes a baseboard 1102, or "motherboard," which is a printed circuit board to which a multitude of components or devices may be connected by way of a system bus or other electrical communication paths. In one illustrative configuration, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a RAM 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the configurations described herein.

The computer 1100 may operate in a networked environment using logical connections to remote computing devices and computer systems through a network, such as the local area network 118. The chipset 1106 may include functionality for providing network connectivity through a NIC 1112, such as a gigabit Ethernet adapter. The NIC 1112 is capable of connecting the computer 1100 to other computing devices over the network 118. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1120 utilized to control the operation of the computer 1100. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 1118 may store other system or application programs and data utilized by the computer 1100. For example, the mass storage device 1118 might store the deployment agent 112 when the architecture shown in FIG. 11 is utilized to implement a host 110. The mass storage device 1118 might also store other programs and data not specifically identified herein.

In one configuration, the mass storage device 1118 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various routines described above with regard to FIGS. 3-7. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, an input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11.

The disclosure presented herein also includes the subject matter set forth in the following clauses:

Clause 1: A non-transitory computer-readable storage medium having computer-executable instructions stored thereupon which, when executed by a computer, cause the computer to: receive a customer-provided deployment configuration at a deployment service executing in a service provider network, the deployment configuration defining a location of an application revision containing an application to be deployed to one or more hosts in a deployment group and a deployment schedule for deploying the application; determine, based upon the deployment schedule, whether to cause the application to be deployed to at least a subset of the one or more hosts in the deployment group; and instruct a deployment agent executing on the subset of the one or more hosts in the deployment group to obtain the application revision from the location and to deploy the application on the subset of the one or more hosts.

Clause 2: The non-transitory computer-readable storage medium of clause 1, wherein the application revision is stored by a storage service in the service provider network.

Clause 3: The non-transitory computer-readable storage medium of clauses 1 and 2, wherein the application revision is stored by a source code repository external to the service provider network.

Clause 4: The non-transitory computer-readable storage medium of clauses 1-3, wherein the one or more hosts are provided by an on-demand computing service operating in the service provider network.

Clause 5: The non-transitory computer-readable storage medium of clauses 1-4, wherein the one or more hosts are located in a customer network external to the service provider network.

Clause 6: The non-transitory computer-readable storage medium of clauses 1-5, wherein the deployment schedule specifies a percentage-based deployment, an exponential deployment, or a function-based deployment.

Clause 7: The non-transitory computer-readable storage medium of clauses 1-6, wherein the application revision further defines one or more deployment lifecycle events to be performed prior to deploying the application on the subset of the one or more hosts, following deployment of the application on the subset of the one or more hosts, prior to executing the application on the subset of the one or more hosts, or following the execution of the application on the subset of the one or more hosts.

Clause 8: An apparatus for performing a deployment of an application to one or more hosts, the apparatus comprising: a processor; and a non-transitory computer-readable storage medium having instructions stored thereupon which are executable by the processor and which, when executed, cause the apparatus to expose one or more network service application programming interfaces (APIs) external to a service provider network for configuring the deployment of the application to the one or more hosts, receive a customer-supplied deployment configuration by way of one of the APIs, the deployment configuration specifying a location of the application and a schedule for deployment of the application, and utilize the schedule to instruct at least a portion of the one or more hosts to obtain the application from the location and to deploy the application.

Clause 9: The apparatus of clause 8, wherein a deployment service executing in the service provider network exposes the one or more network service APIs.

Clause 10: The apparatus of clauses 8 and 9, wherein the one or more hosts operate in the service provider network or in a network external to the service provider network.

Clause 11: The apparatus of clauses 8-10, wherein the schedule specifies a percentage-based deployment, an exponential deployment, or a function-based deployment.

Clause 12: The apparatus of clauses 8-11, wherein the application comprises only one or more files that have changed as compared to a previous version of the application.

Clause 13: The apparatus of clauses 8-12, wherein the application revision further defines one or more deployment lifecycle events.

Clause 14: The apparatus of clauses 8-13, wherein the lifecycle events are performed on the portion of the one or more hosts prior to deploying the application on the portion of the one or more hosts, following deployment of the application on the portion of the one or more hosts, prior to executing the application on the portion of the one or more hosts, or following the execution of the application on the portion of the one or more hosts.

Clause 15: A computer-implemented method for automating the deployment of an application to one or more hosts, the method comprising performing computer-implemented operations for: exposing, by way of a computer, one or more network service application programming interfaces (APIs) external to a service provider network for configuring the deployment of the application to the one or more hosts; receiving a customer-supplied deployment configuration through one of the APIs, the deployment configuration specifying a location of the application and a schedule for deployment of the application; and utilizing the schedule to instruct the one or more hosts to obtain the application from the location and to deploy the application.

Clause 16: The computer-implemented method of clause 15, wherein the schedule specifies a percentage-based deployment, an exponential deployment, or a function-based deployment.

Clause 17: The computer-implemented method of clauses 15 and 16, wherein the deployment configuration further defines one or more failure conditions for the deployment, and wherein the method further comprises: determining whether the one or more failure conditions have occurred; and rolling back the deployment of the application from the one or more hosts in response to determining that the one or more failure conditions have occurred.

Clause 18: The computer-implemented method of clauses 15-17, wherein the one or more hosts operate in the service provider network or in a network external to the service provider network.

Clause 19: The computer-implemented method of clauses 15-18, wherein the application is stored by a storage service in the service provider network or by a source code repository external to the service provider network.

Clause 20: The computer-implemented method of clauses 15-19, wherein the application revision further defines one or more deployment lifecycle events to be performed on the one or more hosts in conjunction with the deployment of the application.

Clause 21: A non-transitory computer-readable storage medium having computer-executable instructions stored thereupon which, when executed by a computer, cause the computer to: receive, at a computer system executing a deployment service, a customer-defined deployment configuration specifying a schedule for performing a rolling deployment of an application to a plurality of hosts; select a first subset of the plurality of hosts based on the schedule; cause the application to be deployed to the first subset of the hosts; select a second subset of the plurality of hosts based, at least in part, on the schedule; and cause the application to be deployed to the second subset of the plurality of hosts following successful completion of the deployment of the application to the first subset of the plurality of hosts.

Clause 22: The non-transitory computer-readable storage medium of clause 21, wherein the schedule comprises a percentage-based deployment schedule.

Clause 23: The non-transitory computer-readable storage medium of clauses 21 and 22, wherein the schedule comprises an exponential deployment schedule.

Clause 24: The non-transitory computer-readable storage medium of clauses 21-23, wherein the schedule comprises a function-based deployment schedule.

Clause 25: The non-transitory computer-readable storage medium of clauses 21-24, wherein the deployment of the application is performed in-place on the plurality of hosts.

Clause 26: The non-transitory computer-readable storage medium of clauses 21-25, wherein the deployment of the application is performed by deploying the application to a new host, adding the new host to the plurality of hosts, and removing one of the hosts from the plurality of hosts.

Clause 27: The non-transitory computer-readable storage medium of clauses 21-26, wherein the deployment configuration further specifies one or more lifecycle events to be performed in conjunction with the deployment of the application to the plurality of hosts.

Clause 28: An apparatus for performing a rolling deployment of an application to a plurality of hosts, the apparatus comprising: a processor; and a non-transitory computer-readable storage medium having instructions stored thereupon which are executable by the processor and which, when executed, cause the apparatus to receive a deployment configuration specifying a user-defined schedule for performing the rolling deployment of the application to the plurality of hosts, select a first subset of the plurality of hosts based, at least in part, on the user-defined schedule, cause the application to be deployed to the first subset of the plurality of hosts, and cause the application to be deployed to one or more additional subsets of the plurality of hosts selected based, at least in part, on the user-defined schedule following successful completion of the deployment of the application to the first subset of the plurality of hosts.

Clause 29: The apparatus of clause 28, wherein the user-defined schedule comprises a percentage-based deployment schedule for the application.

Clause 30: The apparatus of clauses 28-29, wherein the user-defined schedule comprises an exponential deployment schedule for the application.

Clause 31: The apparatus of clauses 28-30, wherein the user-defined schedule comprises a function-based deployment schedule for the application.

Clause 32: The apparatus of clauses 28-31, wherein the deployment of the application is performed in-place on the plurality of hosts.

Clause 33: The apparatus of clauses 28-32, wherein the deployment of the application is performed by deploying the application to a new host, adding the new host to the plurality of hosts, and removing a host from the plurality of hosts.

Clause 34: The apparatus of clauses 28-33, wherein the deployment configuration further specifies one or more lifecycle events to be performed on the plurality of hosts in conjunction with the deployment of the application.

Clause 35: A computer-implemented method for performing a rolling deployment of an application to a plurality of hosts, the method comprising performing computer-implemented operations for: receiving, at a computer, a configuration for the deployment that defines a schedule for performing the rolling deployment of the application to the plurality of hosts, causing, by the computer, the application to be deployed to a first subset of the plurality of hosts selected based, at least in part, upon the schedule, and causing, by the computer, the application to be deployed to one or more additional subsets of the plurality of hosts, also selected based, at least in part, on the schedule, following successful completion of the deployment of the application to the first subset of the plurality of hosts.

Clause 36: The computer-implemented method of clause 35, wherein the schedule comprises a percentage-based deployment schedule for the application.

Clause 37: The computer-implemented method of clauses 35 and 36, wherein the user-defined schedule comprises an exponential deployment schedule for the application.

Clause 38: The computer-implemented method of clauses 35-37, wherein the user-defined schedule comprises a function-based deployment schedule for the application.

Clause 39: The computer-implemented method of clauses 35-38, wherein the configuration further specifies one or more failure conditions, and wherein the method further comprises: detecting an occurrence of the one or more failure conditions; and causing the deployment of the application to one or more of the subsets of the plurality of hosts to be rolled back based upon the detection of the occurrence of the one or more failure conditions.

Clause 40: The computer-implemented method of clauses 35-39, further comprising causing one or more lifecycle events to be performed on the plurality of hosts in conjunction with the deployment of the application.

Clause 41: A non-transitory computer-readable storage medium having computer-executable instructions stored thereupon which, when executed by a computer, cause the computer to: perform a deployment of an application to a plurality of hosts by creating one or more new hosts, deploying the application to the one or more new hosts, adding the one or more new hosts to the plurality of hosts, and removing one or more hosts from the plurality of hosts; maintain the removed hosts for a user-specified period of time following the deployment; determine whether one or more user-defined failure conditions occurred during the user-specified period of time following the deployment; and return the removed hosts to the plurality of hosts and remove the new hosts from the plurality of hosts, in response to determining that one or more user-defined failure conditions occurred during the user-specified period of time.

Clause 42: The non-transitory computer-readable storage medium of clause 41, wherein hosts are selected for the deployment based upon a percentage-based deployment schedule.

Clause 43: The non-transitory computer-readable storage medium of clauses 41 and 42, wherein hosts are selected for the deployment based upon an exponential deployment schedule.

Clause 44: The non-transitory computer-readable storage medium of clauses 41-43, wherein hosts are selected for deployment based upon a user-supplied function.

Clause 45: The non-transitory computer-readable storage medium of clauses 41-44, wherein one or more lifecycle events are performed on the plurality of hosts in conjunction with the deployment of the application.

Clause 46: The non-transitory computer-readable storage medium of clauses 41-45, wherein the plurality of hosts are provided by an on-demand computing service operating in a service provider network or are located in a customer network external to the service provider network.

Clause 47: The non-transitory computer-readable storage medium of clauses 41-46, wherein the deployment is performed in response to a call received at a network service application programming interface (API) exposed by a deployment service executing in a service provider network.

Clause 48: An apparatus for performing a deployment of an application to a plurality of hosts, the apparatus comprising: a processor; and a non-transitory computer-readable storage medium having instructions stored thereupon which are executable by the processor and which, when executed, cause the apparatus to cause the deployment of the application to be performed by instantiating one or more new hosts, deploying the application to the one or more new hosts, adding the one or more new hosts to the plurality of hosts, and removing one or more other hosts from the plurality of hosts, maintain the removed hosts for a period of time following the deployment, determine whether one or more failure conditions occurred during the period of time following the deployment, and return the removed hosts to the plurality of hosts and removing the new hosts from the plurality of hosts.

Clause 49: The apparatus of clause 48, wherein hosts are selected for the deployment based upon a percentage-based deployment schedule.

Clause 50: The apparatus of clauses 48-49, wherein hosts are selected for the deployment based upon an exponential deployment schedule.

Clause 51: The apparatus of clauses 48-50, wherein hosts are selected for deployment based upon a user-supplied function.

Clause 52: The apparatus of clauses 48-51, wherein the application comprises only one or more files that have changed as compared to a previous version of the application.

Clause 53: The apparatus of clauses 48-52, wherein one or more lifecycle events are performed on the plurality of hosts in conjunction with the deployment of the application.

Clause 54: The apparatus of clauses 48-53, wherein the plurality of hosts are provided by an on-demand computing service operating in a service provider network or are located in a customer network external to the service provider network.

Clause 55: A computer-implemented method for deploying an application to hosts in a deployment group, the method comprising performing computer-implemented operations for: performing the deployment of the application by causing one or more new hosts to be created, causing the application to be deployed to the one or more new hosts, adding the one or more new hosts to the deployment group, and removing one or more other hosts from the deployment group; maintaining the hosts removed from the deployment group for a period of time following the deployment; determining whether one or more failure conditions occurred during the period of time following the deployment; and returning the hosts removed from the deployment group back to the deployment group and removing the new hosts from the deployment group.

Clause 56: The computer-implemented method of clause 55, wherein hosts are selected for the deployment based upon a percentage-based deployment schedule.

Clause 57: The computer-implemented method of clauses 55 and 56, wherein hosts are selected for the deployment based upon an exponential deployment schedule.

Clause 58: The computer-implemented method of clauses 55-57, wherein hosts are selected for deployment based upon a user-supplied function.

Clause 59: The computer-implemented method of clauses 55-58, wherein the deployment is performed in response to a call received at a network service application programming interface (API) exposed by a deployment service executing in a service provider network.

Clause 60: The computer-implemented method of clauses 55-59, wherein the application is stored in a storage service provided by a service provider network or in a source code repository external to the service provider network.

Based on the foregoing, it should be appreciated that technologies for automated deployment of software components have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium storing instructions that are executable by one or more processors of a computer system to cause the computer system to:
    specify a group of instances to update, the group of instances comprising a first number of operational instances;
    specify a deployment configuration to deploy to update the group of instances,
    wherein the deployment configuration indicates configuration options to indicate the deployment is to be performed by creating new instances in the group of instances to replace affected instances in the group of instances with the new instances and then removing the affected instances, wherein creation of the new instances in the group results in a second number of operational instances in the group during the update, wherein the second number is larger than the first number;
    start an update to the specified group of instances according to the configuration options;
    retain the affected instances for a period of time after the affected instances have been removed from the group;
    as a result of a determination that a customer-defined alarm condition has occurred prior to the expiration of the time period, add at least one of the affected instances back to the group of instances; and de-provision the affected instances removed from the group upon expiration of the period of time.

2. The non-transitory computer-readable storage medium of claim 1, wherein the instances are virtual machine instances offered by a service provider.

3. The non-transitory computer-readable storage medium of claim 1, wherein the instructions further cause the computer system to:

remove at least one of the new instances from the group of instances.

4. The non-transitory computer-readable storage medium of claim 1, wherein:

the group of instances is hosted by a service provider; and the deployment configuration specifies a location, at the service provider, of deployable content to be used for the update.

5. The non-transitory computer-readable storage medium of claim 1, wherein the group of instances and the deployment configuration is specified via an application programming interface.

6. The non-transitory computer-readable storage medium of claim 1, wherein the deployment configuration indicates a location of deployable content to be deployed during the update, the deployable content comprising executable and non-executable files.

7. A computer-implemented method, comprising:
obtaining information that:
  specifies a group of instances to update;
  specifies a deployment configuration to deploy to update the group of instances, wherein the deployment configuration indicates configuration options to indicate the deployment is to be performed by creating new instances in the group of instances to replace running affected instances with the new instances and then removing the running affected instances;
performing an update to the specified group of instances according to the configuration options; and
prior to de-provisioning the affected instances:
  retaining the affected instances for a period of time after the affected instances have been removed from the group; and
  upon determining that a customer-defined alarm condition has occurred, adding at least one of the affected instances back to the group of instances.

8. The computer-implemented method of claim 7, wherein the instances are virtual machine instances.

9. The computer-implemented method of claim 7, wherein creation of the new instances in the group results in a number of running instances in the group increasing during the update.

10. The computer-implemented method of claim 7, wherein the deployment configuration specifies a location of deployable content to be used for the update and the method comprises obtaining the deployable content from the location to use in the update.

11. The computer-implemented method of claim 10, wherein the deployable content comprises executable and non-executable files.

12. The computer-implemented method of claim 7, wherein the information is obtained via an application programming interface.

13. The computer-implemented method of claim 7, wherein the deployment configuration comprises data identifying the group of instances to which the update is to be applied.

14. A system, comprising:
a set of processors; and
a non-transitory computer-readable storage medium storing thereupon instructions which are executable by the set of processors and which are executable to cause the system to:
  obtain information that:
    specifies a group of instances to update; and
    specifies a deployment configuration to deploy to update the group of instances, wherein the deployment configuration indicates configuration options to indicate the deployment is to be performed by creating new instances in the group of instances to replace operational affected instances with the new instances and then removing the operational affected instances;
  perform an update to the specified group of instances according to the configuration options; and
  upon determining that a customer-defined alarm condition has not occurred prior to expiration of a configurable period of time, de-provision the operational affected instances upon expiration of the configurable period of time, wherein occurrence of the customer-defined alarm condition causes the system to add at least one of the affected instances back to the group of instances.

15. The system of claim 14, wherein the group of instances comprises virtual machine instances.

16. The system of claim 14, wherein performing the update results in a number of operational instances in the group increasing during the update.

17. The system of claim 14, wherein the deployment configuration specifies a location of deployable content to be used to update each instance in the group of instances and the instructions further cause the system to obtain the deployable content from the location.

18. The system of claim 17, wherein the deployable content comprises an executable file and a non-executable file.

19. The system of claim 14, wherein the information is obtained via an application programming interface provided by the system.

20. The system of claim 14, wherein:
the group of instances comprises virtual machine instances;
performing the update results in a number of instances in the group increasing during the update;
the deployment configuration specifies a location of deployable content to be used to perform the update;
the deployable content comprises an executable file;
the deployable content comprises a non-executable file;
the system comprises an application programming interface; and
the system obtains the information via the application programming interface.

* * * * *